US012533701B2

(12) United States Patent
Kinne et al.

(10) Patent No.: US 12,533,701 B2
(45) Date of Patent: Jan. 27, 2026

(54) SYSTEMS FOR HIGH PRODUCTION EXTERIOR WALL SPRAYING

(71) Applicant: Graco Minnesota Inc., Minneapolis, MN (US)

(72) Inventors: Robert W. Kinne, Andover, MN (US); James C. Schroeder, Ramsey, MN (US); William M. Blenkush, Becker, MN (US); Barry W. Mattson, Otsego, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 18/439,580

(22) Filed: Feb. 12, 2024

(65) Prior Publication Data

US 2024/0278277 A1 Aug. 22, 2024

Related U.S. Application Data

(63) Continuation of application No. 17/114,094, filed on Dec. 7, 2020, now Pat. No. 11,896,987.

(60) Provisional application No. 62/944,908, filed on Dec. 6, 2019, provisional application No. 62/944,918, filed on Dec. 6, 2019, provisional application No. 62/944,895, filed on Dec. 6, 2019.

(51) Int. Cl.

| | |
|---|---|
| ***B05B 13/00*** | (2006.01) |
| ***B05B 12/00*** | (2018.01) |
| ***B05B 12/12*** | (2006.01) |
| ***B05B 15/68*** | (2018.01) |

(52) U.S. Cl.
CPC .......... *B05B 13/005* (2013.01); *B05B 12/002* (2013.01); *B05B 12/124* (2013.01); *B05B 15/68* (2018.02)

(58) Field of Classification Search
CPC ..... B05B 13/005; B05B 15/68; B05B 12/002; B05B 12/124
USPC .......................................................... 239/722
See application file for complete search history.

(56) References Cited

U.S. PATENT DOCUMENTS

| | | | |
|---|---|---|---|
| 1,440,147 | A | 12/1922 | Heinrich |
| 3,219,276 | A | 11/1965 | Norris |
| 3,274,860 | A | 9/1966 | Gauthier et al. |
| 3,863,393 | A | 2/1975 | Goff |

(Continued)

FOREIGN PATENT DOCUMENTS

| | | | |
|---|---|---|---|
| CN | 201826508 | A | 5/2011 |
| CN | 203008337 | U | 6/2013 |

(Continued)

*Primary Examiner* — Chee-Chong Lee

(57) ABSTRACT

This disclosure presents several options for spraying paint on large elevated surfaces. In a first example, a lift is equipped with sensors to move a painter along the wall in a serpentine pattern while maintaining a constant separation distance and orientation to facilitate spraying of the wall. In a second example, a spray stamp frame is positioned on the wall in a plurality of different positions to spray discrete portions of the wall by a slide bar that moves along the spray stamp frame at each position. In a third example, one or more cables are strung between vertical supports along the wall and a spray module is moved along or by the cables to spray the horizontal stripe, and this process is repeated to spray a plurality of horizontal stripes at different elevations to spray the wall.

15 Claims, 12 Drawing Sheets

(56) References Cited

U.S. PATENT DOCUMENTS

| | | | |
|---|---|---|---|
| 4,048,956 A | 9/1977 | Estebanez et al. | |
| 4,838,492 A | 6/1989 | Berry | |
| 5,355,823 A * | 10/1994 | Goldbach | E04G 5/12 114/222 |
| 5,358,568 A | 10/1994 | Okano et al. | |
| 5,419,734 A | 5/1995 | Van Sickle | |
| 5,901,720 A | 5/1999 | Lange | |
| 5,935,657 A | 8/1999 | Melendez | |
| 6,544,336 B1 | 4/2003 | Lopes | |
| 8,298,347 B2 | 10/2012 | MacNeil et al. | |
| 9,302,286 B2 | 4/2016 | Morton | |
| 9,393,594 B2 | 7/2016 | Logan et al. | |
| 9,995,047 B2 | 6/2018 | Raman et al. | |
| 10,179,344 B2 | 1/2019 | Logan et al. | |
| 10,486,182 B2 | 11/2019 | Raman et al. | |
| 10,538,417 B1 | 1/2020 | Raman et al. | |
| 10,612,197 B1 | 4/2020 | Raman et al. | |
| 10,619,363 B2 | 4/2020 | Raman et al. | |
| 10,626,562 B2 | 4/2020 | Raman et al. | |
| 2007/0000442 A1 | 1/2007 | Schucker | |
| 2008/0251010 A1 | 10/2008 | Atwood | |
| 2010/0143089 A1 | 6/2010 | Hvass et al. | |
| 2010/0205450 A1* | 8/2010 | Sarnacke | B60R 25/00 713/185 |
| 2010/0220113 A1* | 9/2010 | Kennedy | G06F 3/04845 345/660 |
| 2010/0256861 A1* | 10/2010 | Hodges | H04L 12/40006 701/31.4 |
| 2010/0256864 A1* | 10/2010 | Ying | H04W 24/00 715/810 |
| 2010/0293081 A1* | 11/2010 | Liu | G05B 19/048 710/305 |
| 2017/0080438 A1 | 3/2017 | Storr | |
| 2019/0374966 A1 | 12/2019 | Thompson et al. | |
| 2019/0388926 A1 | 12/2019 | Raman et al. | |
| 2020/0016619 A1 | 1/2020 | Raman et al. | |
| 2020/0109972 A1 | 4/2020 | Raman et al. | |
| 2020/0122178 A1 | 4/2020 | Logan | |
| 2020/0407989 A1 | 12/2020 | Logan | |

FOREIGN PATENT DOCUMENTS

| | | | |
|---|---|---|---|
| CN | 104131686 | A | 11/2014 |
| CN | 104343230 | A | 2/2015 |
| EP | 3549577 | A1 | 9/2019 |
| JP | 59109272 | A | 6/1984 |
| JP | 62079865 | A | 4/1987 |
| JP | 63069559 | A | 3/1988 |
| KR | 100699129 | B1 | 3/2007 |
| WO | WO1998020982 | A1 | 5/1998 |
| WO | WO1998034734 | A1 | 8/1998 |
| WO | WO2017145183 | A1 | 8/2017 |

* cited by examiner

SYSTEMS FOR HIGH PRODUCTION EXTERIOR WALL SPRAYING

CROSS-REFERENCE TO RELATED APPLICATIONS

This application is a continuation of U.S. application Ser. No. 17/114,094 filed Dec. 7, 2020 entitled SYSTEMS FOR HIGH PRODUCTION EXTERIOR WALL SPRAYING, which in turn claims priority to each of U.S. Provisional Application No. 62/944,895 filed on Dec. 6, 2019, and entitled "WALL SPRAYING LIFT HAVING CONSTANT SEPARATION DISTANCE", U.S. Provisional Application No. 62/944,908 filed on Dec. 6, 2019, and entitled "WALL SPRAYING STAMP FRAME", and U.S. Provisional Application No. 62/944,918 filed on Dec. 6, 2019, and entitled "CABLE SUPPORTED WALL SPRAYING MODULE", the disclosures of which are hereby incorporated by reference in their entireties.

BACKGROUND

Airless spraying has been used to spray paint and other fluids into walls, including exterior walls representing larger and taller projects. However, such spraying has traditionally been performed entirely manually with a human operatory holding a spray gun and moving the spray gun to spray the wall. To spray elevated portions of a wall, scaffolding and/or ladders can have been used to elevate the operator, risking falls. In these cases, the process is manual and labor intensive, and ultimately inefficient. This disclosure presents several example systems for automating aspects of exterior painting of large, tall walls.

SUMMARY

This summary is presented as a series of enumerated, layered examples. However, these examples do not represent all possible examples or the full scope of this disclosure.

In example 1, a mobile lift for moving an arm along a wall, the lift comprising: a mobile base; an arm extending from the base, the arm configured to articulate in three dimensions relative to the base; one or more motors configured to articulate the arm in the three dimensions relative to the base; at least one sensor supported by the arm and configured to output an indication of a separation distance between the sensor and the wall; a user input configured to receive a directional input corresponding to a command to move an end of the arm along the wall in a first direction, and control circuitry configured to: receive the indication of the distance between the sensor and the wall, receive the directional input, control the at least one motor to articulate the arm in at least two dimensions so that the end of the arm moves along the wall in the first direction while maintaining the separation distance.

In example 2, the lift of example 1, wherein: the user input is configured to receive four directional inputs corresponding to four respective commands to move an end of the arm along the wall in four respective directions, the respective directions comprising up, down, left, and right, and the control circuitry is configured to control the at least one motor to articulate the arm in at least two dimensions so that the end of the arm moves along the wall selectively in each of the four directions while maintaining the separation distance, the particular direction depending on which one of the four respective commands was received.

In example 3, the lift of example 2, wherein the control circuitry is configured to move the end of the arm in a serpentine pattern in response to input of at least three of the four respective commands while maintaining the separation distance.

In example 4, the lift of any preceding example, wherein the separation distance is selected by the user.

In example 5, the lift of any preceding example, wherein the arm articulates in three dimensions relative to the base by: the arm being mounted on a turret that rotates relative to the base, the turret being configured to pivot the arm relative to the turret, the arm being configured to extend relative to the turret to selectively lengthen and shorten the arm, and the one or more motors are configured to articulate the arm in at least two dimensions so that the end of the arm moves along the wall in the first direction while maintaining the separation distance by simultaneously rotating the turret relative to the base, pivoting the arm relative to the turret, and extending the arm relative to the turret.

In example 6, the lift of any preceding example, wherein the control circuitry is configured to move the end of the arm along the wall in the first direction after the input is made such that the end of the arm moves along the wall in the first direction without concurrent input by the used.

In example 7, the lift of any preceding example, wherein the control circuitry is configured to operate the one or more motors to articulate the arm in at least two dimensions so that the end of the arm moves along the wall in the first direction while maintaining the separation distance and while the base remains stationary.

In example 8, the lift of any preceding example, further comprising a sprayer configured to spray fluid from the end of the arm onto the wall while the end of the arm moves along the wall in the first direction while maintaining the separation distance.

In example 9, the lift of any preceding example, further comprising a bucket attached to the end of the arm.

In example 10, the lift of any preceding example, wherein the one or more sensors are attached to the bucket.

In example 11, a method of operating a lift, the method comprising: receiving an input to move an end of an arm of a lift along a wall while a base of the lift remains stationary; controlling one or more motors to move the arm along the wall based on the input; receiving one or more distance indications from one or more sensors supported on the arm, the one or more distance indications indicating the distance between the arm of the lift and the wall; wherein controlling the one or more motors further comprise maintaining a set separation distance between an end of the arm and the wall as the arm is moved along the wall based on the one or more distance indications.

In example 12, the method of example 11, further comprising receiving a setting input indicating the set separation distance input by a user.

In example 13, the method of any of examples 11-12, wherein the input is one of four directions along the wall, the four directing being up, down, left, and right.

In example 14, the method of any of examples 11-13, further comprising spraying the wall from the end of the arm while controlling the one or more motors to move the arm along the wall based on the input.

In example 15, the method of example 14, wherein the step of spraying is performed by an operator in a bucket.

In example 16, an apparatus for spraying a fluid on a wall, the apparatus comprising: a frame, the frame positionable along the wall; a slide bar mounted to the frame, the slide bar configured to move relative to the frame while spraying the fluid onto the wall.

In example 17, the apparatus of example 16, wherein the frame is four sided and defines a window that extends through frame.

In example 18, the apparatus of example 17, wherein the slide bar is located within the window and moves within the window.

In example 19, the apparatus of example 17, wherein the slide bar is mounted to the frame such that the slide bar sprays the fluid through the window onto the wall.

In example 20, the apparatus of any of examples 16-19, wherein the frame includes a first side configured to face away from the wall while the fluid is being applied and a second side configured to face the wall while the fluid is being applied, and the slide bar is located on the first side of the frame and moves along the first side of the frame while spraying the fluid onto the wall.

In example 21, the apparatus of any of examples 16-18, wherein the frame includes a first side configured to face away from the wall while the fluid is being applied and a second side configured to face the wall while the fluid is being applied, and the slide bar is located on the second side of the frame.

In example 22, the apparatus of any of examples 16-21, wherein the frame and the slide bar are configured such that the slide bar moves relative to the slide bar to spray the fluid into the wall while the frame remains stationary relative to the wall.

In example 23, the apparatus of any of examples 16-22, wherein the frame is rectangular having a top side, a bottom side, a left side, and a right side.

In example 24, the apparatus of any of examples 16-23, wherein the slide bar has a first end and a second end, and either: the first end is mounted on the top side, the second end is mounted on the bottom side, and the slide bar moves laterally along the frame, or the first end is mounted on the left side, the second end is mounted on the right side, and the slide bar moves vertically along the frame.

In example 25, the apparatus of any of examples 16-24, further comprising one or more electric motors that move the slide bar relative to the frame, the one or more motors mounted on one or both of the slide bar and the frame.

In example 26, the apparatus of any of examples 16-25, further comprising one or more sensors that monitor movement of the slide bar relative to the frame.

In example 27, the apparatus of any of examples 16-26, further comprising one or more sensor mounted on the frame to face the wall.

In example 28, the apparatus of any of examples 16-27, further comprising a mobile base configured to support and reposition the frame along the wall at a plurality of different wall locations, wherein the spray bar is configured to move relative to the frame serially located at each of the plurality of different wall locations to spray the fluid on the wall while the frame is stationary at each of the plurality of different wall locations.

In example 29, the apparatus of any of examples 16-27, further comprising a cable system configured to suspend the frame along the wall and repositions the frame along the wall at a plurality of different wall locations.

In example 30, a method of using the apparatus of any of examples 16-29 to apply the fluid to the wall.

In example 31, the method of example 30, comprising: positioning the frame along a first section of the wall; moving the slide bar relative to the frame while the slide bar applies the fluid to the first section of the wall while the frame remains stationary along the wall; repositioning the frame along a second section of the wall; and moving the slide bar relative to the frame while the slide bar applies the fluid to the second section of the wall while the frame remains stationary along the wall, wherein the first and section sections are continuous so that the fluid is applied to the wall without a gap between the first and second sections.

In example 32, an apparatus for applying a fluid to a wall, the apparatus comprising: a spray module configured to move along the wall and spray the wall; a cable support comprising: at least two vertical supports; and one or more cables extending horizontally between the at least two vertical supports, wherein the spray module is suspended by the one or more cables, the one or more cables facilitating horizontal movement along the wall of the spray module between the at least two vertical supports while the spray module sprays the wall.

In example 33, the apparatus of example 32, wherein the each of the at least two vertical supports are configured to reposition the one or more cables at different horizontal elevations to allow spraying by the spray module of higher and lower sections of the wall.

In example 34, the apparatus of any of examples 32-33, wherein at least one of the at least two vertical supports comprises a post.

In example 35, the apparatus of example 34, wherein each of the at least two vertical supports comprises a cable module that moves vertically along the post, each of the one or more cables attached to one or more of the cable modules.

In example 36, the apparatus of any of examples 32-35, wherein at least one of the at least two vertical supports comprises a mobile lift having an extendable arm, wherein each of the one or more cables is attached to the at least one of the at least two vertical supports.

In example 37, the apparatus of any of examples 32-36, wherein the cable support comprises a cable module mounted on each of the vertical supports, the cable module having a reel that pulls in and lets out the one or more cables to control the position of the spray module.

In example 38, the apparatus of any of examples 32-37, wherein the spray module includes a spray valve for controlling release of spray fluid on the wall.

In example 39, the apparatus of any of examples 32-38, wherein the spray module includes a reservoir of spray fluid.

In example 40, the apparatus of any of examples 32-38, wherein a plurality of tubes supply power and spray fluid from off the spray module to the spray module while the spray module moves horizontally and sprays.

In example 41, the apparatus of any of examples 32-40, wherein the spray module includes one or more wheels that roll along the one or more cables.

In example 42, the apparatus of example 41, wherein the spray module includes at least one motor that moves the spray module along the one or more cables.

In example 43, the apparatus of any of examples 32-42, wherein the one or more cables comprise at least two cables extending from each vertical support to the spray module In example 44, the apparatus of any of examples 32-33, wherein the spray module includes a spray nozzle and a motor configured to move the nozzle vertically relative to the spray module.

In example 45, the apparatus of example 44, wherein the motor moves the nozzle vertically to compensate for sag of the one or more cables.

In example 46, a method of using the apparatus of any of examples 32-45 to apply the fluid to the wall, the method comprising: positioning the spray module along a first section of the wall, the spray module suspended by the one or more cable between the at least two vertical supports; moving the spray module horizontally across the wall while the spray module sprays a horizontal stripe along the first section; repositioning the spray module along a second section of the wall at a different height by changing the elevation of the one or more cables via the at least two vertical supports; and moving the spray module horizontally across the wall while the spray module sprays a horizontal stripe along the second section.

DETAILED DESCRIPTION

The present disclosure concerns spray systems. Such systems are particularly useful for spraying large, elevated structures. While walls be used as main examples as sprayed surfaces, it will be understood that the systems and techniques as described herein can be equally applied to other elevated structures. While the application of spraying will be used herein as the main example, systems according to the present disclosure can be used for other applications including taping (applying temporary masking before spraying), washing, building, maintenance, and other functions. Spraying can include spraying paints and other coatings on the wall, as well as washing fluid.

Figure 1:
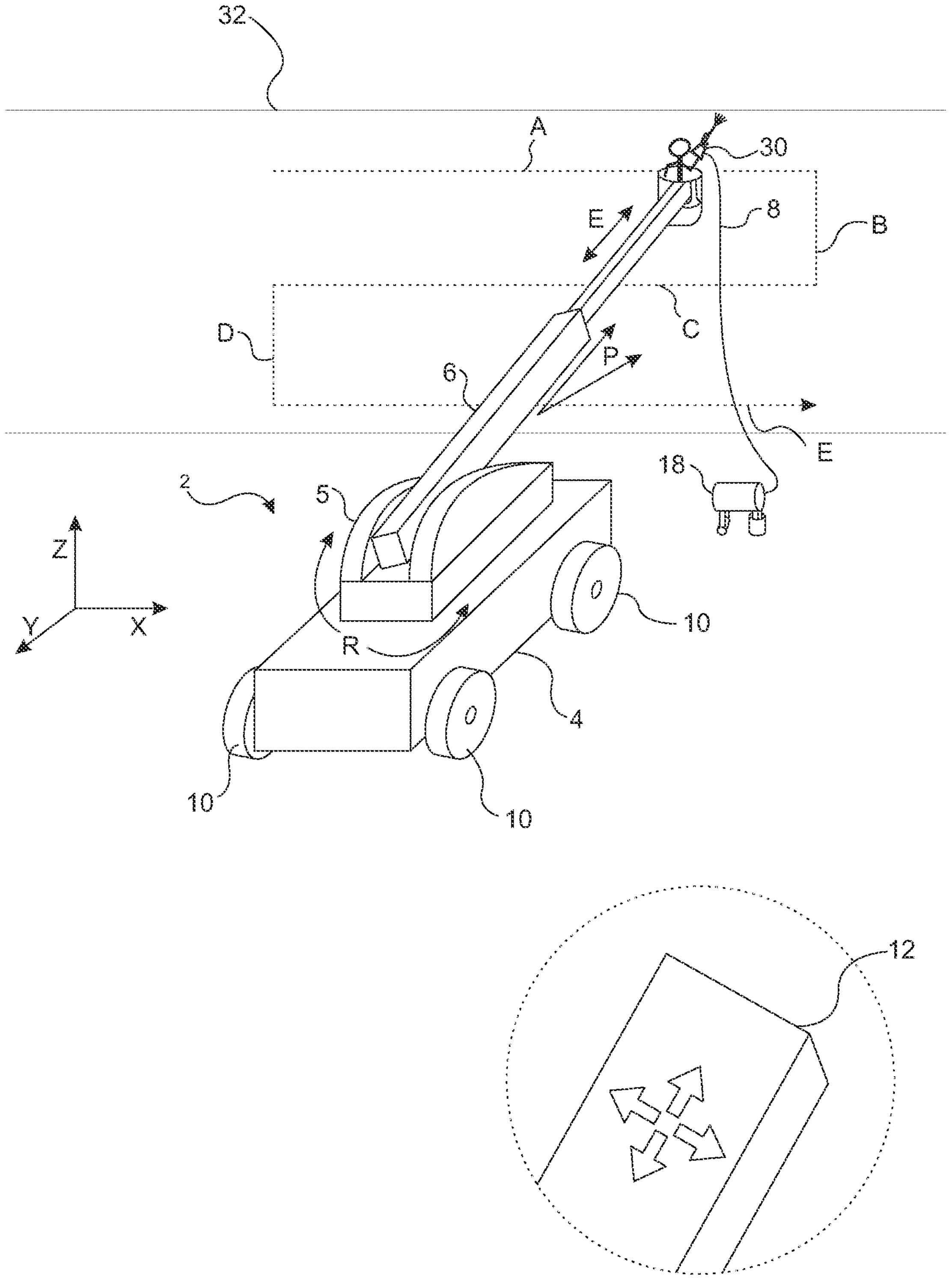
FIG. 1 is a perspective view of a lift spray system for spraying a wall.

FIG. 1 shows a lift 2 in operation. The lift 2 includes a base 4 supported by wheels 10. While wheels 10 are shown, it will be understood that tracks could be used alternatively. In this way, the lift 2 is mobile and can reposition itself. The base 4 can support motors, generators, fluid reservoirs, control circuitry, and other parts referenced herein. For example, the base 4 can include a combustion engine and a fluid reservoir for powering the combustion engine. The combustion engine can power various parts of the lift 2 as well as operate a generator for supplying electric power to any of the components shown herein. Alternatively, the base 4 may receive electrical power from an external power source and/or be battery powered.

The base 4 includes a turret 5. As shown, turret 5 can rotate (R) relative to the base 4. The turret 5 supports arm 6. The arm 6 can move relative to the turret 5. For example, as shown, the arm 6 can pivot (P) relative to the base 4 and/or turret 5, and can extend (E) relative to the base 4 and/or turret 5. The arm 6 may telescope to extend, although various other embodiments may allow extension of the arm 6 without telescoping.

A bucket 8 is located at the end of the arm 6. While a bucket 8 is shown in this embodiment, other components can be alternatively or additionally included at the end of the arm 6, such as a platform or an automatic, remote spraying module (e.g., one of the spray modules later presented herein). The bucket 8 can hold one or more people and their equipment. In this case, an operator is in the bucket 8, operating a paint sprayer to spray fluid on the wall 32. In this case, the fluid is paint. A pump 18 is located on the ground and provides fluid under pressure to spray gun 30 via a hose. The spray gun 30 is operated by the user to spray the paint on the wall 32. Typically, the operator holds a spray gun 30 and points the spray gun 30 at the wall 32, moving the spray gun 30 in a sweeping motion. The pump 18 draws paint from a bucket and pumps it with a piston through the hose to the spray gun 30. Alternatively, the pump 18 can be located in the bucket 8. The bucket 8 may be a full enclosure with an opening from which the user my spray or the bucket 8 may be a partial enclosure. The bucket 8 is shown with panel walls, however in some embodiments, the bucket 8 may only include a railing or other type of guard to prevent the user from falling out.

FIG. 1 includes a detailed view of a user interface 12. In this case, the user interface 12 is a remote control used for operating the lift 2. As shown, the user interface includes a plurality of buttons corresponding with up, down, left, and right. Other inputs may be present on the user interface 12, such as a touch screen. The user can operate the user interface 12 from the bucket 8. The user interface 12 can communicate commands to control circuitry of the lift 2 (e.g., by wired or wireless connection) to cause the motors of the lift 2 to rotate, pivot, and extend the arm 6 to move the bucket 8 along the wall 32.

To paint the wall 32, the user operates the user interface 12 to control the lift to move the bucket 8 in a pattern along the wall 32 while the operator sprays the wall 32 with the spray gun 30. At a stationary position of the bucket 8, the operator can only spray a small portion of the wall 32, therefore the lift 2 needs to move the bucket 8 along the wall 32 to cover the wall 32 in spray fluid. In this case, the pattern is a serpentine pattern composed of horizontal and vertical segments. In particular, the pattern includes a horizontal segment A, a vertical segment B, a horizontal segment C which doubles back parallel with segment A, another vertical segment D, and then a final segment E which parallels segments A and C. In operation, the user may position the bucket 8 using the interface 12 at the start of segment A, and then move the bucket 8 along segment A while spraying the wall 32 by hand, such that the bucket 8 is moved while the user sprays. The user may use the interface 12 to stop horizontal movement of the bucket at the end of segment A and then use the user interface 12 to move bucket vertically along segment B. The user continues these operations for segments C, D and E, spraying the wall 32 while the bucket 8 is moving. In some embodiments, the user may only need to depress one button on the interface 12 for each segment. For example, pressing a “right” button to move the bucket 8 rightward along segment A, even though the bucket 8 is moved in three dimensional space, and the lift 2 maintains the separation distance of the bucket 8 with the wall 32 during the motion, at an consistent speed along segment A, so that the user can spray the wall 32 from a constant distance and constant speed, ensuring an even coat of paint. The user can then press “down” on the control to move the bucket 8 along segment B, and then “left” at the start of segment C to cause the lift to move the bucket 8 linearly along segment C. This can be repeated for segments D and E.

Figure 2:
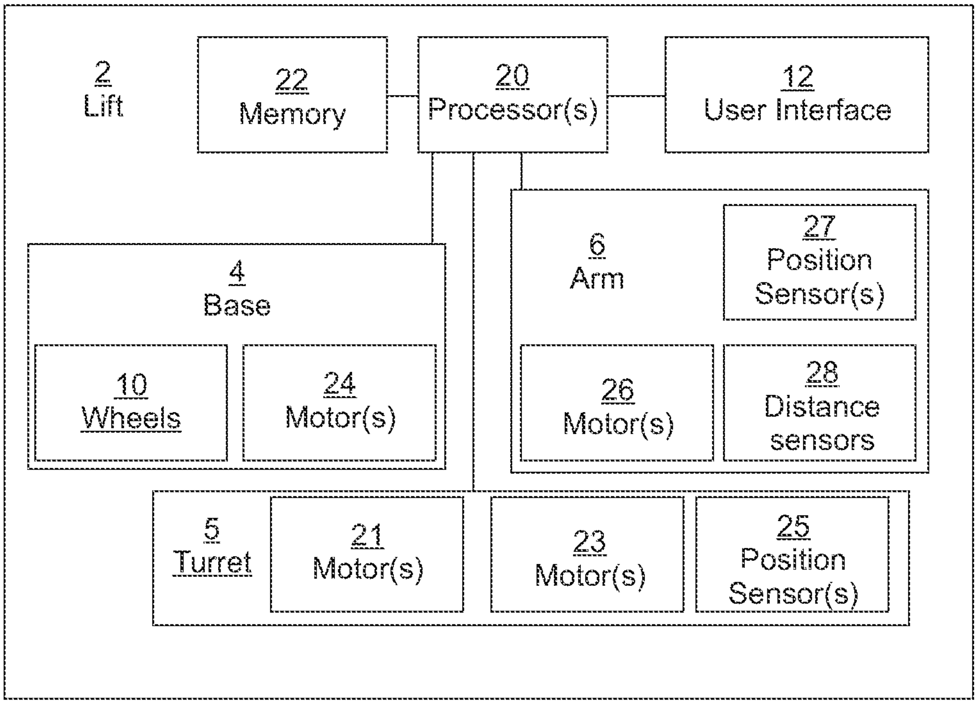
FIG. 2 is a schematic view representing control circuitry for the lift spray system.

FIG. 2 is a schematic of the components of the lift 2. The schematic shows control circuitry and controls operation of the lift 2. Control circuitry can include a processor 20 in communication with memory 22. Memory 22 can include program instructions, executable by the processor 20, for performing and/or causing performance of any of the operations referenced herein. The processor 20 can be a single processor such as an integrated microchip, or multiple processing units in communication. User interface 12 can communicate with processor 20. Control circuitry can additionally or alternatively include other types of logic circuitry, such as gate arrays, for performing the functions referenced herein. Control circuitry, including the processor 20, can operate the motors referenced herein to perform the operations herein. Some of all of such control circuitry can be included in any embodiment referenced herein.

The lift 2 includes one or more motors 24 for moving the wheels 10 to reposition the base 4. An input can be provided on the user interface 12 more controlling the motors 24 to rotate wheels 10 to reposition the lift 2.

The arm 6 includes sensors 28. The sensors 28 can be mounted directly on the boom portion of the arm 6, on the bucket 8, or on another portion of the arm 6. In some embodiments, the sensors 28 face the wall 32 or are otherwise positioned to sense the relative position of the wall 32. For example, one or more sensors 28 can be mounted on the front of the bucket 8 for sensing the distance between the sensor 28 and the wall 32. The sensors can be lidar, ultrasonic, or other type of sensor configured to sense distance. The sensor 28 can include one or more cameras for capturing images or video.

The lift 2 includes multiple motors 26 which move the arm 6. For example, three motors 26 can be provided, respectively controlling the rotation (R), pitch (P), and extension (E) of the arm 6. Furthermore, a motor 26 can be provided to pivot the bucket 8 relative to the end of the arm 6. The motors 26 can be electrically powered rotor-stator type. In some embodiments, articulation of the arm 6 can be hydraulically powered, such that a hydraulic pump moves hydraulic fluid to piston-cylinder actuators, the operation of actuators controlled by motor controlled electric valves.

Figure 3:
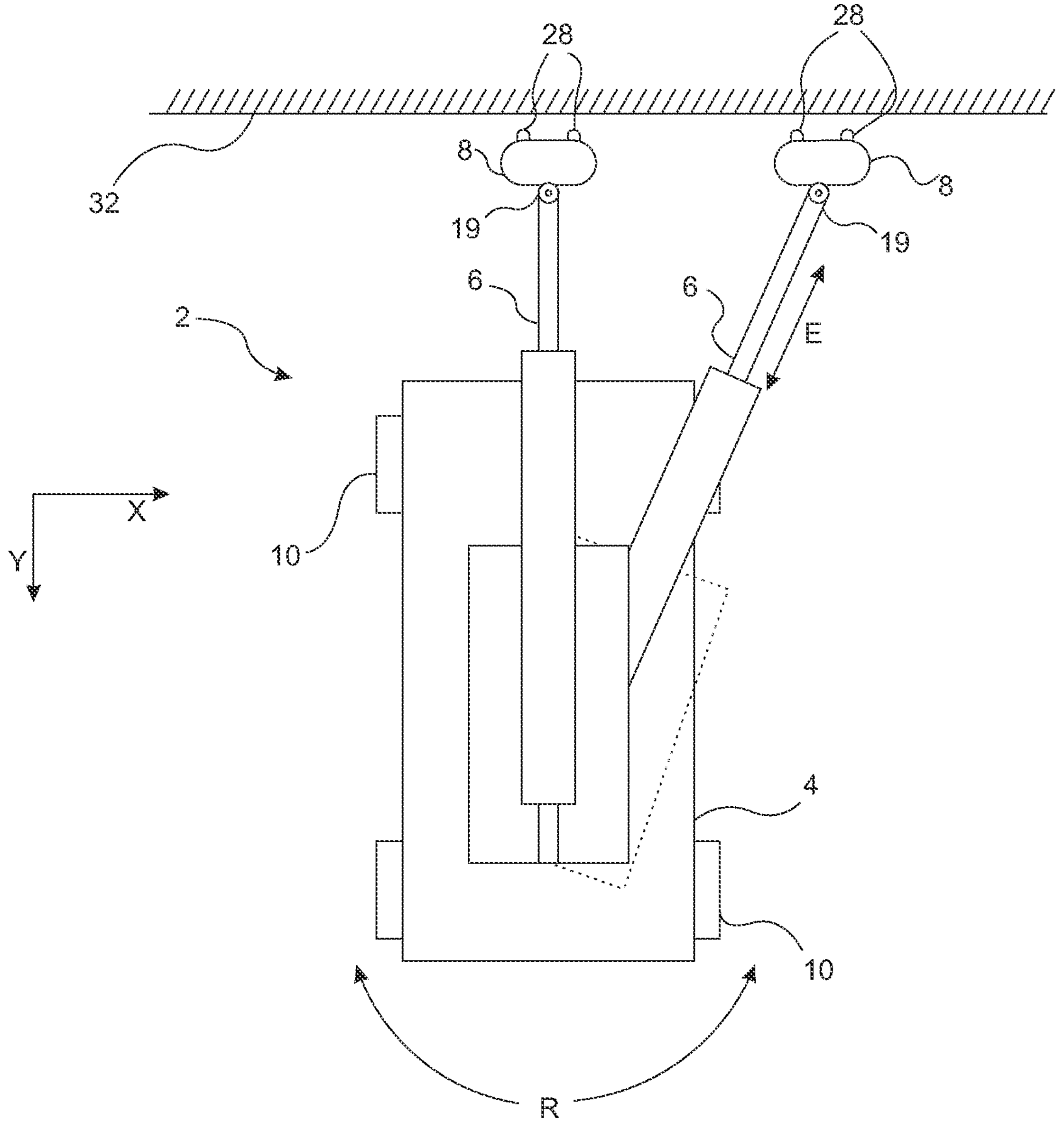
FIG. 3 is an overhead view of the lift spray system moving a bucket along the wall.

From the bucket 8, the operator can only reach so much of the wall by hand for spraying. To reposition the bucket 8, the operator can input commends into the use interface 12 to cause the lift 2 to move the bucket 8. FIG. 3 is an overhead view that shows movement of the bucket 8 on the end of the arm 6. Specifically, two positions of the arm 6 are shown representing movement of the arm 6 and bucket 8 along the wall 32. Being that the base 4 remains stationary during movement of the arm 6, the bucket 8 will necessarily move closer or further away from the wall 32 if the arm 6 is only moving in one of extension (E), rotation (R), or pitch (P). In some versions of the interface 12, two buttons can be provided for extension (one for greater length and one for lesser length), two buttons can be provided for rotation (one for clockwise rotation and one for counterclockwise rotation), and two buttons can be provided for pitch (one for greater pitch corresponding to greater elevation of the arm 6 and one for lesser pitch corresponding to lesser elevation of the arm 6). However, it can be difficult for users to efficiently and accurately manipulate all these buttons simultaneously to move the bucket 8 in 3D space, particularly while trying to spray the wall 32. Accordingly, the lift 2 includes a control system for easily maintaining a proper work distance between the bucket 8 and the wall 32 while the operator controls movement of the bucket 8, as further explained herein.

The lift 2 includes a mode by which the control circuitry operates the motors 21, 23, 26 to move the turret 5 and arm 6 to position the bucket 8 a constant (or near constant, within a limited range) distance from the wall 32 as monitored and guided by the sensors 28. Instead of the user individually controlling each of rotation, pitch, and extension, the user can push a single button of the user interface 12 to move the bucket 8 along the wall 32 (e.g., parallel with the wall 32) while maintaining a constant distance from the wall 32, and while the base 4 remains stationary. The control circuitry receives feedback from sensors 25, 27, and 28 so that the distance to the wall 32 and orientations of the turret 5 and arm 6 are known. If the user pushes the right button on the user interface 12, the control circuitry can cause the motors 21, 23, 26 to move the bucket 8 rightward along the wall 32 (e.g., corresponding to segment A) without changing the separation distance between the bucket 8 and the wall 32. To do this, control circuitry causes the motors 21, 23, 26 to simultaneously rotate the turret 5 (and thus the arm 6) to point it in the rightward direction while also shortening the arm 6 (for the first part of the segment A, for the second part of the segment A the arm 6 will extend) to maintain the wall 32—bucket 8 separation distance. Furthermore, motor 23 changes the pitch of the arm 6 so that the bucket 8 remains of the same horizontal level along the segment A. Alternatively, if the user had pressed the leftward button, control circuitry because the motors 26 to simultaneously rotate the arm 62 point more leftward while lengthening the arm and changing the arm 6 pitch. Similarly, if the user pressed the downward button of the user interface 12, intending for the bucket 8 to move vertically along segment B, the control circuitry 20 would cause the motor 23 to decrease the pitch of the arm 6 while also shortening the extension of the arm 6 and rotating the turret 5 to move the bucket 8 in a purely vertical pass. Alternatively, if the user pressed the upward button of the user interface 12, the control circuitry 20 would cause the motor 23 to increase the pitch of the arm 6 while also lengthening the extension of the arm 6 and rotating the turret 5 to move the bucket 8 in a purely vertical pass. The motions along the segments A, B, C, D, and E can each be commanded by a single respective button press (e.g., rightward for A, down for B, leftward for C, etc.) on the interface 12 for each segment while the control circuitry operates motors 26, 21, 26 to move the bucket 8 linearly in three dimensional space. In some cases, pressing such a button once causes linear movement of the bucket 8 in the indicated direction until another button is pressed to stop the movement, while in some other cases a directional button must be continuously pushed throughout the movement. In any case, the movement occurs while the user does not need to make any separate input to adjust the distance between the bucket 8 and the wall 32, simplifying the input control for the user.

FIG. 3 shows the bucket 8 in two different positions, such as if traveling along segment A of FIG. 1. If the arm 6 were merely to pivot "R" as shown and extend "E" as shown, then the bucket 8 would no longer directly face the wall 32 but would rather be at an angle as the bucket 8 is moved laterally along the wall 32. However, the control circuitry compensates by pivoting the bucket 8 relative to the arm 32 so that the bucket 8 continues to directly face the wall 32 (or at least maintain its starting orientation relative to the wall 32 throughout the movement of the arm 6) while moving along the wall 32. This allows the operator to spray the wall 32 from a constant orientation instead of contorting more and more as the bucket 8 moves along the wall 32. As shown in FIG. 3, the bucket 8 remains facing the wall 32, flush, in each of the positions. Such an orientation of the bucket 8 relative to the wall 32 is important for spraying of the wall 32 by the operator. Therefore, during each of the motions along the segments A, B, C, D and E, the bucket 8 can pivot relative to the arm 6 by articulation of joint 19. Joint 19 may be a multi-hinge type, knuckle type, or a ball-in-socket type, to articulate in 2 or 3 dimensions. Joint 19 may include a motor 26, which can be integrated into the joint 19, to pivot the bucket 8 relative to the arm 6 during motion along the wall 32 to maintain the bucket 8 always directly facing the wall 32. For example, both of the sensors 28 can be equidistant from the wall 32 at all times during the movement, to manage a consistent orientation of the bucket 8 relative to the wall 32, and the processor 20 can adjust the orientation at the joint 19 if the distances measured by the respective sensors 28 are not equal.

To maintain the separation distance, if the sensors 28 indicate that one of the sensors 28 is nearing the wall 32 by a particular amount (e.g., 1 inch) during a repositioning of the bucket 8, then the control circuitry can cause the one or more motors 21, 23, 26 to pull the bucket 8 back corresponding to the particular amount, such as be shortening the arm 6. Likewise, if the sensors 28 indicate that one of the sensors 28 is getting further from the wall 32 by a particular amount, then the control circuitry can cause the one or more motors 21, 23, 26 to move the bucket 8 toward the wall 32 corresponding to the particular amount, such as by lengthening the arm 6. Likewise, if one of the sensors 28 indicates that it is moving closer to the wall 32 relative to the other sensor 32, then the processor 20 can cause articulation of the joint 19 to re-orientate the bucket 8 relative to the arm 6. In this way, the control circuitry is responsive to the separation distance between the bucket 8 and the wall 32 as indicated by the sensors 28 and the control circuitry automatically provides inputs to motors 21, 23, and 26 to maintain this separation distance so that the worker is always a desired working distance from the wall 32 and orientation relative to the wall 32.

Therefore, a user can select a single direction to move along the face of the wall 32, and presses a single button corresponding to that direction (e.g., left, right up, or down), and the control circuitry controls the motors 26, 21, 23 to reposition the bucket 8 in 3D space in the indicated direction while maintaining the separation distance between the bucket 8 and the wall 32 so that the user can continue to spray or perform another manual task on the wall 32. In this way, the user can control the bucket 8 to move along the wall 32 in a serpentine pattern, as shown in FIG. 1, to allow for spraying of the wall 32. In some cases, a user can set a fixed movement speed for directional movement so that the user can focusing on spraying while the control circuitry controls a fixed speed directional sweep along the wall 32.

When not in the constant separation mode, the user can control movement of each of extension, pitch, and rotation individually, and the control circuitry does not make any adjustments to extension, pitch, and rotation to maintain separation. But when in the constant separation mode, extension, pitch, and rotation are all automatically managed by control circuitry to maintain the separation distance. The separation distance is programmable by the user, so that the control circuitry can maintain different separation distances based on the preference of the user, such as 1 foot, 2 feet, 3 feet, etc. Also, the separation distance may have a tolerance, expressed as a distance or a percentage, within which the control circuitry will not make an adjustment so as to avoid frequent adjustments. For example, a user can input 3 feet as the separation distance with a tolerance of 2 inches. If the sensor 28 is closer than 2 feet, 10 inches, then the control circuitry will cause the arm to move the bucket 8 back 2 inches. If the sensor 28 is further than 3 feet, 2 inches, then the control circuitry will cause the arm to move the bucket 8 forward 2 inches. If the sensor 28 is between 2 feet, 10 inches and 3 feet, 2 inches, then the control circuitry does not cause the arm to move the bucket 8.

Figure 4:
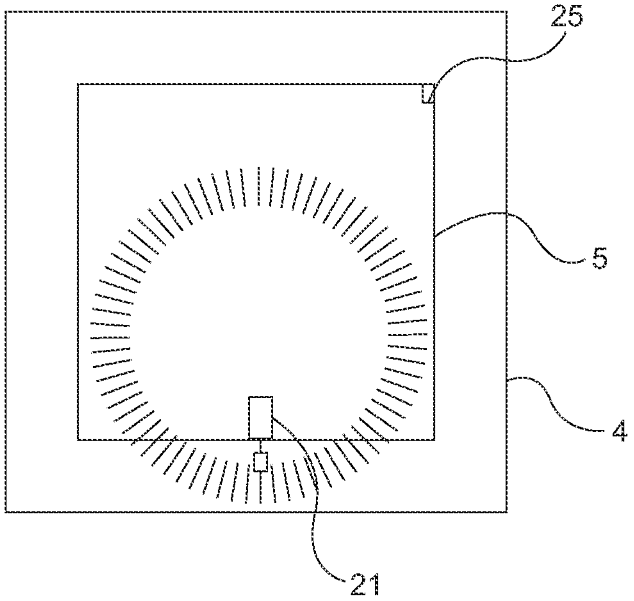
FIG. 4 is a partial overhead view showing turret rotation components of the lift spray system.

FIG. 4 shows an overhead, schematic view of the turret 5 and the base 4, demonstrating how the turret 5 can be rotated relative to the base 4. A motor 21 is provided on the turret 5, the motor 21 outputting rotational motion as directed by the control circuitry to pinion which engages track. The track can be located on the base 4 and can represent an arc or circle. Alternatively, the motor 21 can be located in the base 4 and the track can be located on the turret 5. The track can include teeth, gears, or other features that engaged the pinion of the motor 21. Sensor 25 can sense the position of the turret 5 relative to the base 4, to provide feedback to the processor 20 so that the rotational position of the turret 5 is known relative to the base 4, such as for maintaining horizontal or vertical movement of the end of the arm 6. Sensor 25 can be an encoder, amongst other possibilities.

Figure 5:
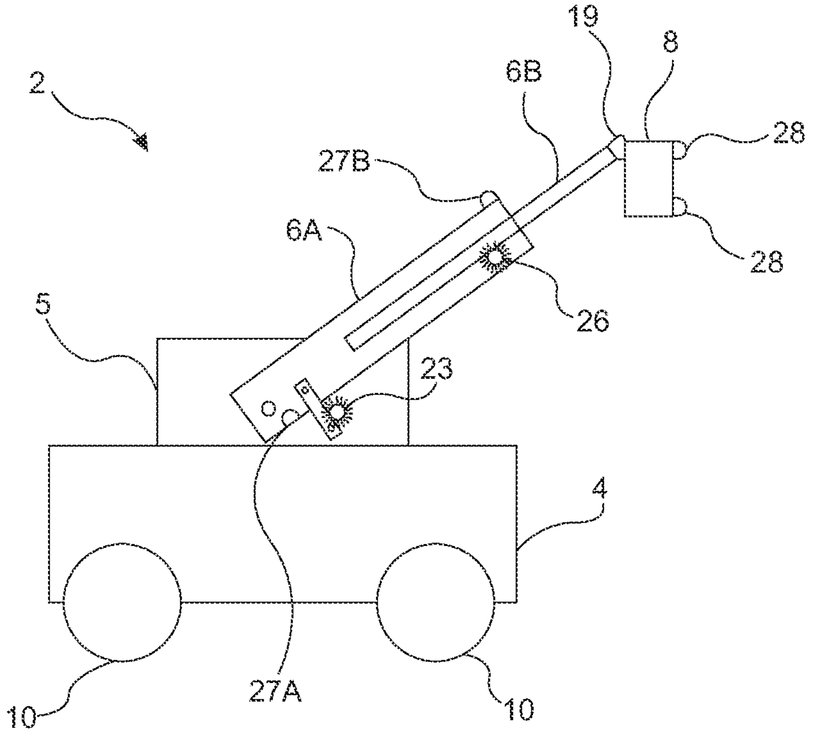
FIG. 5 is a partial side view showing components for pivoting and extending the arm of the lift spray system.

FIG. 5 shows a schematic, cross-sectional side view of the lift 2. Demonstrated in FIG. 5 are the mechanisms for pivoting the arm 6 relative to the turret 5 and extending the arm 6. Motor 23 in engages a member which extends between the turret 5 and the arm 6, the motor 23 rotating in either direction to move the number down or up to pivot the arm 6 upwards or downwards relative to the turret 5. The motor 23 can include a pinion that engages a track (e.g., on the member) having teeth, gears, or other features that engaged the pinion of the motor 23. Sensor 27A measures the change in position of the arm 6 relative to the turret 5 to measure pitch (P) of the arm 6. Sensor 27A can be an encoder or distance sensor (e.g., laser range finder), amongst other options. The sensor 27A can provide information regarding the pitch of the arm 8 to the processor 20 for controlling the motors 21, 23, 26 to position the bucket 8 as described herein.

As shown in FIG. 5, the arm 6 is comprises a first arm portion 6A and a second arm portion 6B. The second arm portion 6B moves within the first arm portion 6A in a telescoping manner to extend the length of the arm 6 (E). Motor 26 is mounted on the first arm portion 6A, engages the second arm portion 6B with a pinion and track interface, and rotates the pinion to extend or retract the second arm portion 6B relative to the first arm portion 6A, as one option. Relative positions between the first arm portion 6A and the second arm portion 6B can be measured by sensor 27B, mounted on one or both of the first arm portion 6A and the second arm portion 6B. The sensor 27B can be an encoder. The sensor 27B can provide information regarding the length of the arm 8 to the processor 20 for controlling the motors 21, 23, 26 to position the bucket 8 as described herein.

The control circuitry is able to move the bucket 8 along a linear path on the wall 32, such as segment A, based on the starting parameters of rotational orientation (R) of the turret 5 (via sensor 24), pivot angle (P) of the arm 6 (via sensor 27A), and length (E) of the arm 6 (via sensor 27B). Furthermore, the control circuitry can determine the distance from the bucket 8 to the wall 32 via sensors 28, and thus knows the three-dimensional position of the bucket 8 relative to the wall 23. The control circuitry then receives a command to move the bucket 8 in a linear direction along the wall 23, and the control circuitry can calculate the positional changes of the rotational orientation (R) of the turret 5, pivot angle (P) of the arm 6, and length (E) of the arm 6 to move the bucket 8 along the linear path while maintaining the separation distance from the wall 32, and control the motors correspondingly, while also monitoring the change in R, P, and E via sensors 24, 27A, and 27B.

The next embodiment concerns a stamp frame 4 spraying walls. While the application of spraying will be used herein as the main example, apparatuses according to the present disclosure can be used for other applications including washing, rolling, brushing, taping, and other functions. Spraying can include spraying paints and other coatings on the wall.

FIGS. 6-10 generally concerns a frame which can be placed against a wall for painting a particular section of the wall. The frame can then be moved to another section for painting discrete portions of the wall one at a time in a stamping manner. Each section of the wall can be sprayed, rolled, brushed, coated in some other manner treated while the frame is located over the section. Each repositioning of the frame can be adjacent and aligned with the prior section so that all parts of the wall can be sprayed or otherwise treated serially.

Figure 6:
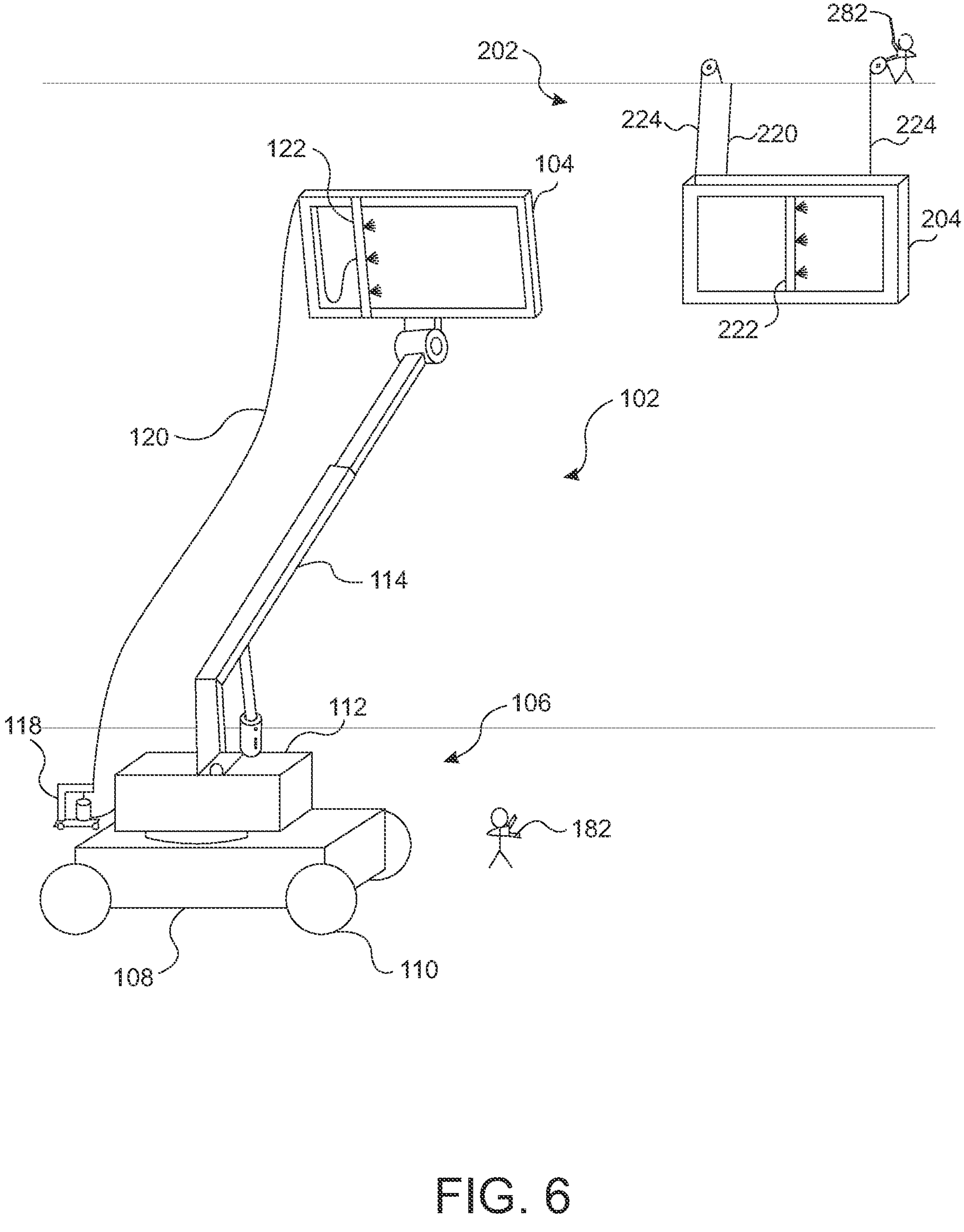
FIG. 6 is a perspective view of two spray stamp systems for spraying a wall.

FIG. 6 shows stamping system 102. The stamping system 102 includes a lift 106 which holds up a stamp frame 104. The lift 106 includes a base 108 and is mobile via wheels 110. The lift 106 can have the same features as previously described and/or shown for the lift 2, and the lift 2 can have the same features as shown and/or described for lift 106. One or more motors within the base 108 can operate the wheels 110 to move the stamping system 102. The lift 106 includes a turret 112 mounted on the base 108 which facilitates rotation of an arm 114 relative to the base 108. The arm 114 extends from the turret 112. In some cases, the arm 114 extends directly from the base 112 and is not rotated relative to the base 108. One or more motors can operate to change the elevated pitch of the arm 114 relative to the base 108. The arm 114 can extend to lengthen or shorten as driven by one or more motors.

The stamping frame 104 is mounted on the far end of the arm 114. The arm 114 is shown as attached to the bottom side of the frame 104, however the arm 114 can be attached to the top or sides or other portion of the stamping frame 104. Stamping frame 104 includes a slide bar 122. The slide bar 122 slides from one side of the stamp frame 104 to the other side of the stamp frame 104. In the illustrated embodiment, the slide bar 122 moves laterally from the left side to the right side of the stamp frame 104, and then back to the left side for spraying another stamp section or respraying the same section. While the slide bar 122 slides left and right in this embodiment, the orientation of the slide bar 122 could be turned 90° on the stamp frame 104 so that the slide bar 122 moves vertically up and down relative to the stamp frame 4. While the slide bar 122 can support brushes, rollers, or other type of fluid dispense, in this particular embodiment the slide bar 122 includes a plurality of spray nozzles which spray the wall while the slide bar 122 moves relative to the frame 104 while the frame 104 remain stationary along the wall. A single spray nozzle may be provided instead of a plurality of spray nozzles. Paint or other type of fluid is supplied to the slide bar 122 from the pump 118 via hose 120. In this case, the pump 118 is on the ground, however the pump 118 can be located on the lift 106 or on the frame 104. Power and/or spray fluid can be routed directly from the lift 106 through the arm 114 to the stamp frame 104.

FIG. 6 includes another embodiment of a stamp frame. Specifically, stamping system 202 is suspended from a roof of the structure instead of being elevated by the lift 106. In this case, stamp frame 204 is suspended from the roof via cables 224. A pump can be located on the roof to supply hose 220 with fluid for spraying by the slide bar 222 which moves relative to the frame 204 to apply the fluid to the wall. The stamp frame 204 can be identical to the stamp frame 104 unless otherwise shown or described to be different.

In operation, the stamp frame 104, 204 is moved from section to section of the wall, spraying the particular section that the stamp frame 104, 204 is positioned over while stationary. In this way, the support structure for the stamp frame (e.g., the lift 106 or the cables 224) hold the stamp frame stationary when spraying is conducted. The motion for spraying is provided by the movement of the slide bar (122, 222) while the rest of the stamp frame 104, 204 is stationary.

An operator controls operation of the stamping system 202 with interface 182, which can include the components and capabilities of any interface referenced herein. An operator controls operation of the stamping system 202 with interface 282, which can include the components and capabilities of any interface referenced herein.

Figure 7:
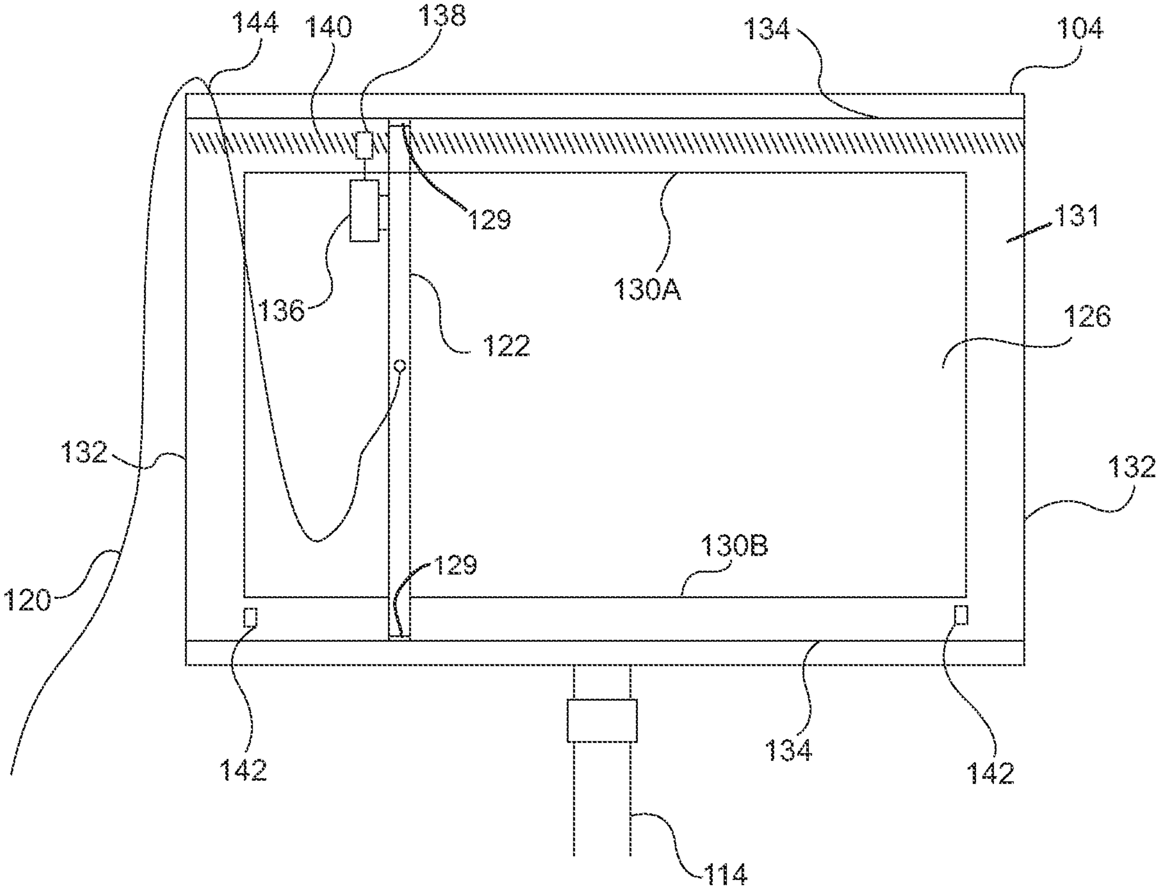
FIG. 7 is a back view of the spray stamp system.

FIG. 7 shows a detailed view of the stamp frame 104, however the teaching and features could be equally applicable to stamp frame 204. The particular side of the stamp frame 104 that is shown is the first side 131, which is the side that faces away from the wall during spraying. The stamp frame 104 is rectangular in shape, but other shapes are possible. Stamp frame 104 includes lateral sides 132, topside 130A, and bottom side 134B. Each of the sides 132, 130A-B can be a metal bar (e.g., tube or beam) joined at its ends to the other sides 132, 130A-B. Sides 132, 130A-B can be hollow to allow the routing of wires and/or fluid hoses. The sides 132, 130A-B can meet at 90 degree joints.

The sides 132, 130A-B surround and define window 126. The window 126 may defines the area of the wall that will be sprayed. For example, the slide bar 122 is mounted on the first side (faces away from the wall during spraying) of the stamp frame 104 while the wall is along the second side of the stamp frame 104. In this way, the nozzles of the slide bar 122 may spray through the window 126, however the nozzles themselves may either extend through the window 22 or otherwise be supported on the second side of the stamp frame 104 in various other embodiments. Alternatively, the slide bar 122 can be located within the window 122 by being surrounded by the sides 132, 130A-B and directly between lateral sides 132 and topside 130A and bottom side 134B.

The stamp frame 104 includes motor 136. In this particular embodiment, the motor 136 is mounted on the slide bar 122. The motor 136 can be an electrical rotor-stator type, amongst other options. The motor 136 outputs rotational motion to pinion 138. Pinion 138 interfaces with track 140. Track 140 may include teeth, gearing, or other feature that can be pushed by rotation of pinion 138. The track 140 is located along one side of the stamp frame 104. Rotation of the pinion 138 pushes against track 140 to move the slide bar 122 across the window 126. The motor 136 can rotate the pinion 138 clockwise and counterclockwise to move the slide bar 122 left and right. While the motor 136, pinion 138, and track 140 are located on the first side of the stamp frame 140, these components can alternatively or additionally be positioned on the second side of the stamp frame 140, within the stamp frame 140, and/or other mechanisms can be used to move the slide bar 122 across the window 126. For example, slide bar 122 may be moved by a cable pulled by a motor winding a reel or rotating a pulley. The motor 136 could be pneumatically powered to move the slide bar 122.

The stamp frame 104 includes brackets 134 located on opposite ends of the stamp frame 104. Specifically, the brackets 134 are orientated horizontally, parallel with the direction of travel of the slide bar 122. The ends of the slide bar 122 are received within slots defined by the brackets 134. Each end of the slide bar 122 can include one or more wheels 129 that roll within the slot to hold and support the slide bar 122 while allowing the slide bar 122 to move laterally. It is noted that the brackets 134 are located on a first side of the stamp frame 104, the first side facing away from the wall, wherein the stamp frame 104 includes a second side that faces toward the wall. Alternatively, the brackets 134 can be located on the second side of the stamp frame 104 or the slots that support the slide bar 122 can be positioned within the top and bottom sides 130A-B (or the lateral sides 132A-B) such that the slide bar 122 is located directly within the window 126.

The spray frame 104 includes sensors 142. The sensors 142 detect the position of the slide bar 122 on the stamp frame 104. In particular, the sensors 142 can indicate when the slide bar 122 is either near or at the end of its intended travel along the stamp frame 104, thereby signaling control circuitry to stop spraying, stop movement of the slide bar 122, and/or reverse direction of the slide bar 122. Sensors 142 can be proximity sensors (e.g., Hall effect sensors). Sensors 142 can be encoders. Another version of sensor can be an encoder on the slide bar 122 reading markings on static portion of the spray frame 104, amongst other options.

The hose 120 supplying paint to the slide bar 122 is attached to support 144 to help with hose management. Support 144 can be a hook, eyelet, clasp, or other component for securing part of the hose 120. Slide bar 122 can operate as a manifold, having a single fluid inlet and multiple fluid outlets. In some other embodiments, the slide bar 122 has equal number of inlets and outlets, such as one or multiple of each. Hose 120 connects with the slide bar 122 to supply spray fluid under pressure. As shown, the hose 120 is loose to contain slack to permit movement of the slide bar 122.

Figure 8:
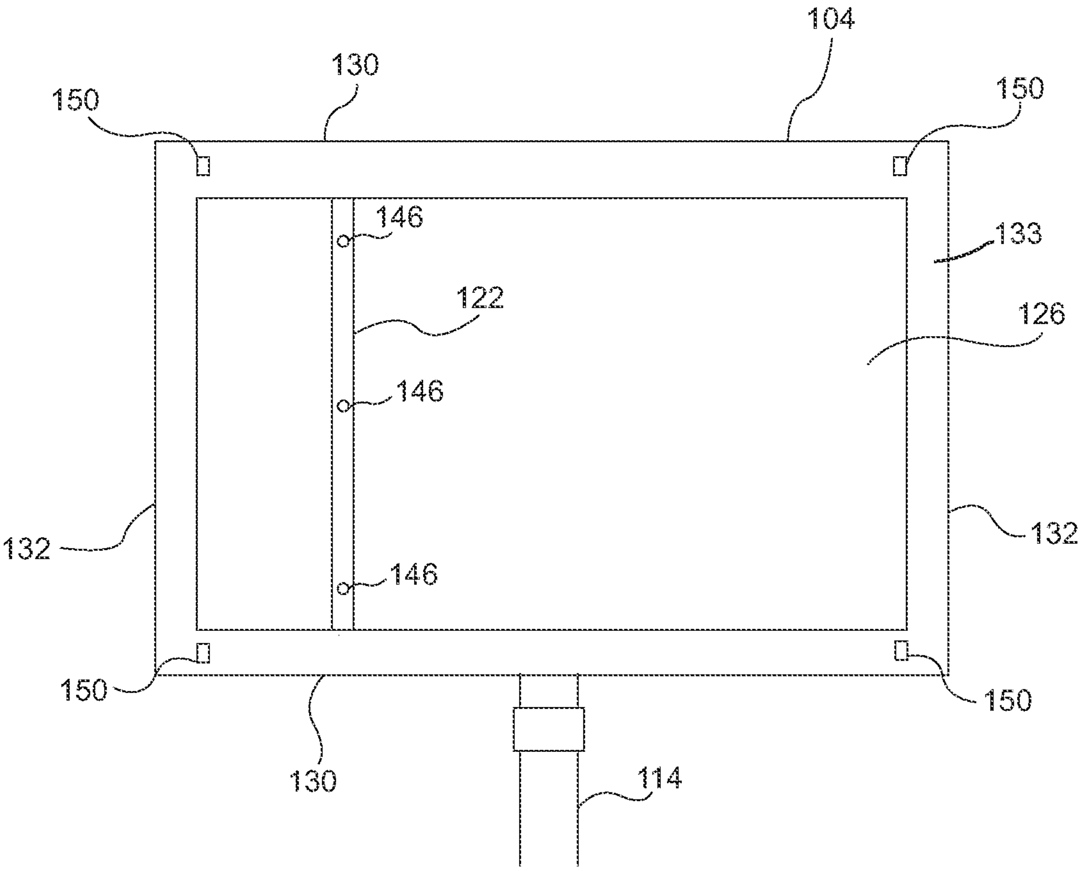
FIG. 8 is a front view of the spray stamp system.

FIG. 8 shows the second side 133 of the stamp frame 104 that faces the wall during spraying. Spray outlets 146 are shown, which can correspond with valves. The valves may be actuated by solenoids to spray on command from control circuitry, or the valves may be overcome by pressure when the pump 118 operates such that operation of the pump 118 begins spraying and the pump 118 is not operated when spraying is not desired. Spray outlets 146 may include a valve that is controlled by control circuitry to open and close, such as to open in coordination when the slide bar 122 is in motion for spraying and to close when the motion of the slide bar 122 stops.

The stamp frame 104 includes sensors 150 on the second side of the stamp frame 104. The sensors 150 can be various types of sensors. The sensors 150 can be rangefinders that measure the distance to the wall. The multiple distances can be monitored by control circuitry to ensure that the plane of spray frame 4 (the plane defined by the four sensors 150) is parallel with the plane of the wall being sprayed (e.g., by the four sensors 150 confirming the same distance to the wall) and/or that the outlets 146 are an intended distance away from the wall being sprayed (e.g., not to close, not too far away) to provide for even coverage of spray fluid on the wall. The sensors 150 can be optical sensors. The sensors 150 can provide video and/or images so that the operator can view by a screen (e.g., on interface 182, 282) what parts of the wall have been painted and which not painted to properly align the stamp with areas that have not been sprayed to avoid spraying areas that have already been sprayed or that would leave an unsprayed gap between adjacent spray sections. Control circuitry may automatically operate motor (s) of the lift 106 or cable 224 system to position the window 126 adjacent to a previously sprayed stamp area, via the sensors 150 providing feedback to the control circuitry regarding what wall surface has not been sprayed and what wall surface has been sprayed, so that spraying of adjacent sections results in a seamless spray pattern between adjacent sections.

Figure 9:
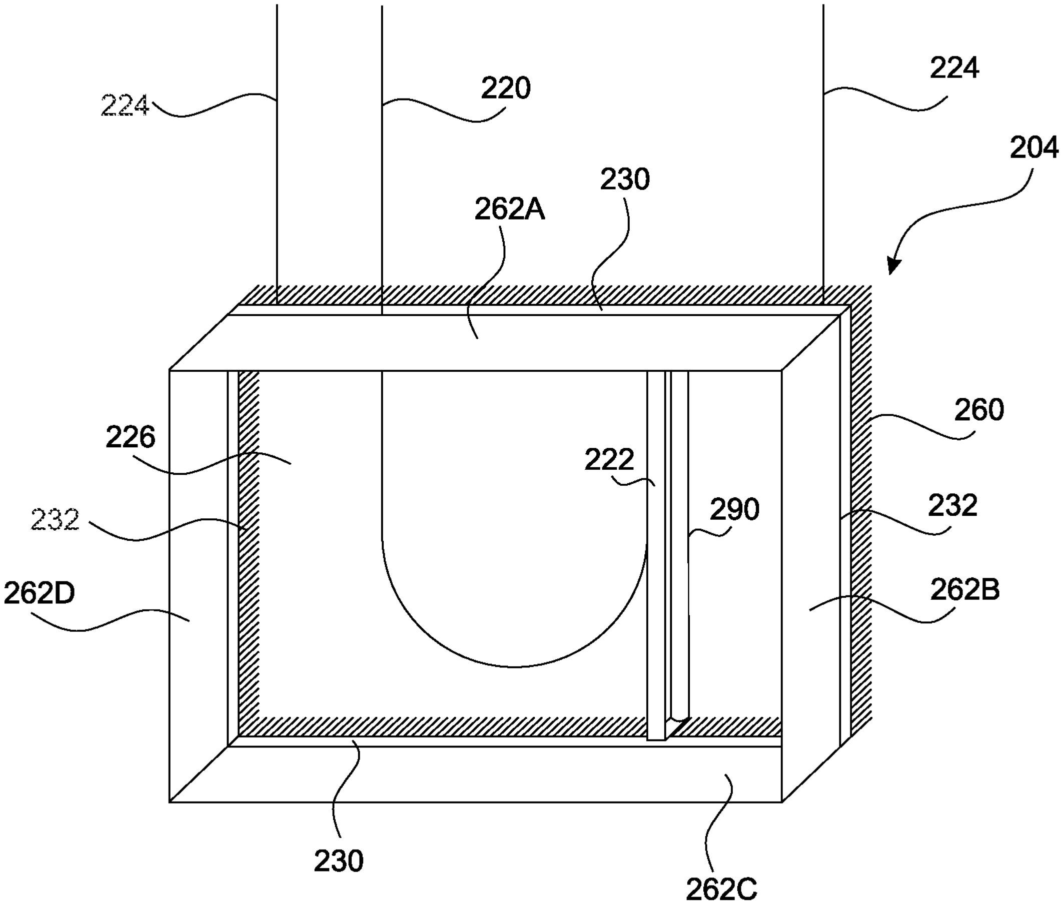
FIG. 9 is a perspective view of another spray stamp system having a shield.

FIG. 9 shows an alternative stamp frame 204. The stamp frame 204 is similar to the previous stamp frame 104, with parts having the same base digit reference numbers (e.g., 132, 232) being similar. The stamp frame 204 includes cables 224, hose 220, sides 232 & 230, and slide bar 222.

FIG. 9 illustrates the hanging version of the stamp frame 204. The stamp frame 204 is similar to the previous stamp frame 104, with parts having the same base digit reference numbers (e.g., 132, 232) being similar. The stamp frame 204 includes cables 224, hose 220, sides 232 & 230, and slide bar 222. This version of the stamp frame 204 also includes shielding. Two types of shielding are shown. Panels 262A-D are shown on the first side of the stamp frame 204. The panels 262A-D may be flexible material (e.g., polymer or cloth) or rigid (e.g., metal, wood, polymer). The panels 262A-D surround the first side of the window 226 to block the wind from getting into the window 226 to disrupt spraying and/or to block overspray from escaping the stamp frame 204. The panels 262A-D can be supported by a subframe. The panels 262A-D are shown to be on four sides (top, bottom, left, right) of the stamp frame 204, extending away from the first side of the stamp frame 204. Additionally or alternatively, a front panel can be included (connecting panels 262A-D like a lid, positioned orthogonal with the panels 262A-D) to enclose the first side of the stamp frame 204, the front panel being parallel with the sides 230, 232 of the stamp frame 204. In this way, no wind from the first side can affect spraying and/or no overspray can escape from the first side.

A second type of shielding shown in FIG. 4 includes brushing 260. The brushing 260 includes bristles that are arranged in a rectangular pattern on the sides 230, 232. The brushing 260 extends from the second side of the stamp frame 204 to contact or be near the wall during spraying to shield the second side of the stamp frame 204 from wind and/or minimize escape of overspray from the second side of the stamp frame 204.

In this particular embodiment of FIG. 9, a roller 290 is mounted on the slide bar 222. The roller is a cylinder with soft exterior for contacting and rolling along the wall as the slide bar 222 moves along the wall to apply and/or smooth paint. The roller 190 moves with the slide bar 122. The slide bar 222 may spray, as previously shown, and then roll over the spayed sections, or alternatively, the spray nozzles may spray directly onto the roller 290.

It will be understood that the options shown in FIG. 9 (e.g., cables 229, brushing 260, and/or panels 262A-D) can be used in any of the other embodiments, and likewise the embodiment of FIG. 9 can be modified to include any of the features of the other embodiments shown herein.

Figure 10:
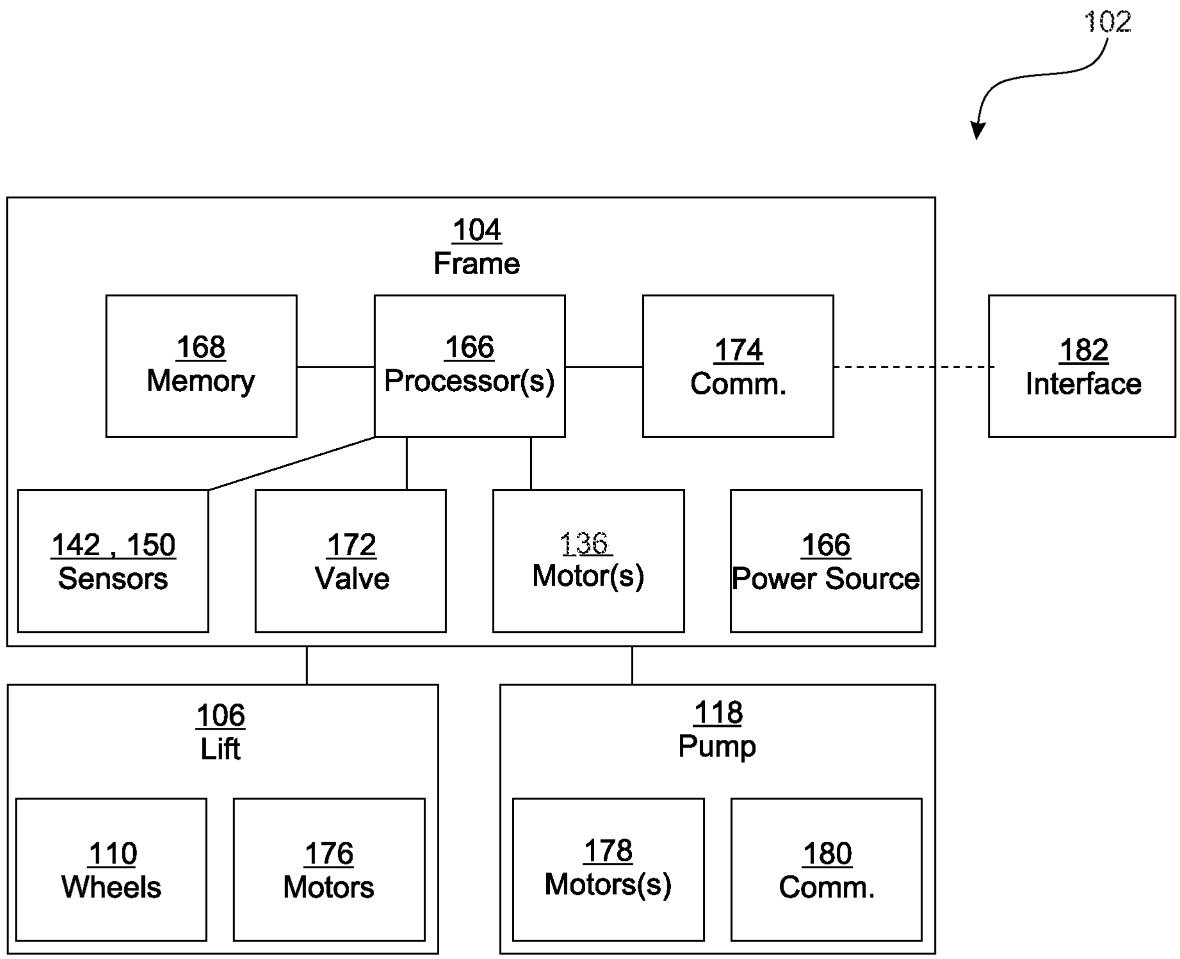
FIG. 10 is a schematic view representing control circuitry for the spray stamp systems.

FIG. 10 is a schematic view of control circuitry components of the stamping system 102, although such control circuitry can be used for stamping system 202 or any other spray system of this disclosure. The schematic shows control circuitry that controls operation of the stamping system 102. Control circuitry can include a processor 166 in communication with memory 168. Memory 168 can include program instructions, executable by the processor 166, for performing any of the operations referenced herein. The processor 166 can be a single processor such as an integrated microchip, or multiple processing units in communication. Communications module 174 can communicate with processor 166. Control circuitry can additionally or alternatively include other types of logic circuitry, such as gate arrays, for performing the functions referenced herein.

Control circuitry can also include an interface 182. The interface 182 can include an equivalent processor and memory amongst other components referenced herein. Interface 182 may be remote from the frame 104 and communicate (e.g., wirelessly) with communications module 174. The interface 182 may be a handheld computer with a readout for displaying information (e.g., images from sensors 150 of the wall) and include inputs for commands (e.g., moving the frame 104 via motors 176 in lift 106, initiating motion of slide bar 122 and/or spraying via valve 172). Interface 182 can receive data from sensors 142, 150 and display images on a screen of the interface 182 to allow the user to position the frame 104 and spray.

While control circuitry is shown as being part of the frame 104, control circuitry can additionally or solely be provided in the interface 182, the lift 106, and/or the pump 18.

Valve 172 is shown for controlling output from the outlets 146. For example, valve 172 can be a solenoid actuated valve controlled by processor 166 to spray when desired (e.g., when stamp frame 104 is in place along the wall and slide bar 122 is in motion) and not spray when not desired. Valve 172 can be integrated into the slide bar 122. For example a valve 172 can be provided for each nozzle 146.

The power source 166 is shown as part of the stamp frame 104. The stamp frame 104 may include various power source 166 of the power source may be fed by lift 6 or the other source such as an electrical cord.

As shown, the lift includes motors 176 for moving the arm 114 relative to the base, such as rotating, pitching, and extending the arm 114 to position the stamp frame 104 along the wall. The processor 166 may control the motors 176 to move the arm 114 of stamp frame 104 serially on adjacent positions of the wall to spray stamp the entire wall one window at a time. In this way, the control circuitry positions the stamp frame 104 along a first part of the wall, and when the stamp frame 104 is stationary, the motor 136 moves the slide bar 122 to spray the first part of the wall, and once the first part is sprayed, the control circuitry positions the stamp frame 104 along a second part of the wall adjacent to the first section, and when the stamp frame 104 is stationary, the motor 136 moves the slide bar 122 to spray the second part of the wall. In this way, there may be no gap between the sprayed first and second parts of the wall. There may no sprayed overlap between the sprayed first and second parts of the wall. In some processes, a 50% overlap may be targeted so that the first and second sections overlap by 50%, such that each part of the wall gets sprayed twice. These processes can be repeated for third, fourth, etc. portions of the wall until the entire wall is sprayed.

The valves 172 are controlled in synchrony with the motor 136 so that the valves 172 only spray when the slide bar 122 is in motion, and the valves 172 do not spray when the slide bar 122 is not moving. The processor 166 may control the valves 172 so that they start spraying sooner after the slide bar 122 is set in motion by the motor 136 (e.g., within 0.1 second), and control the valves 172 so that they stop spraying sooner before the slide bar 122 is stopped (e.g., within 0.1 second), so avoid spraying from a stationary slide bar 122.

The pump 118 includes communication modules 180 for receiving commands from the interface 182 or other part of control circuitry for commanding the pump 118 to operate or not operate, such as operating to pump spray fluid in synchrony with motion of the slide bar 122 as moved by the motor 136.

While the stamp frame has generally been shown herein as a rectangular frame having a window, the frame may not include a window in some embodiments, and as such may be a panel. In various other embodiments, the stamp frame is a vertical bar along which a horizontally orientated slide bar moves vertically to spray fluid on the wall, or the stamp frame is a horizontal bar along which a vertically orientated slide bar moves horizontally to spray fluid on the wall.

FIGS. 11-17 concerns various versions of a cable supported spray module that is moved along a wall to spray the wall. The spray module is supported by one or more cables. The spray module can be moved horizontally along the wall to spray the horizontal stripe. The one or more cable can then be lowered or raised to a different elevated position along the wall, the spray module changing in elevation along with the one or more cables, to reposition the spray module. The spray module can then be moved horizontally along the wall to spray another horizontal stripe, which may be partially overlapping and/or adjacent to the previous horizontal stripe. This process can be repeated to spray the entire wall with paint.

Figure 11:
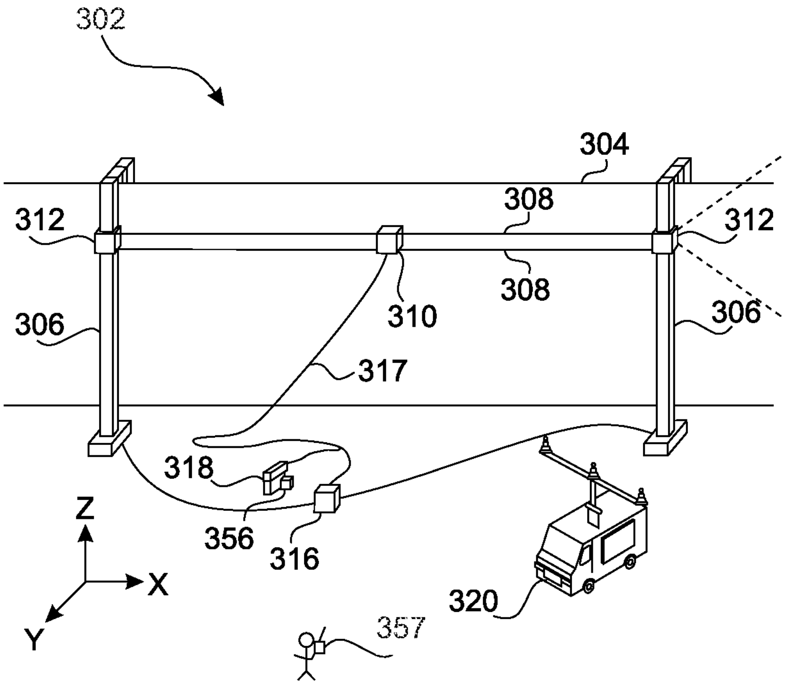
FIG. 11 is a perspective view of a cable spray system for spraying a wall.

FIG. 11 shows a cable-supported spray system 302 for spraying a wall 304. The cable-supported spray system 302 includes vertical supports 306. Vertical supports 306 are shown as vertical beams, however vertical supports 306 can take other forms in various other embodiments. Two vertical supports 306 are shown, however in some cases a single vertical support or greater than two vertical supports could be used. The vertical supports 306 contact and are supported by the ground. Further, the vertical support 306 wrap over the wall 304, such as onto the roof of the structure. In some alternative embodiments, the vertical supports 306 do not wrap over the wall 304 and are entirely supported by the ground, while in some other embodiments the vertical supports 306 are entirely supported by the structure (e.g., wall 304, roof) being sprayed and not the ground.

The cable-supported spray system 302 further includes cables 308 extending between the vertical supports 306. While two cables 308 are shown, a single cable or more than two cables can alternatively be used. The ends of each cable 308 are respectively supported by the two vertical supports 306. Specifically, the ends of the cables 308 are attached to cable modules 312. Cable modules 312 are mounted on the vertical supports 306. Cable modules 312 can move vertically along the vertical supports 306.

Figure 12:
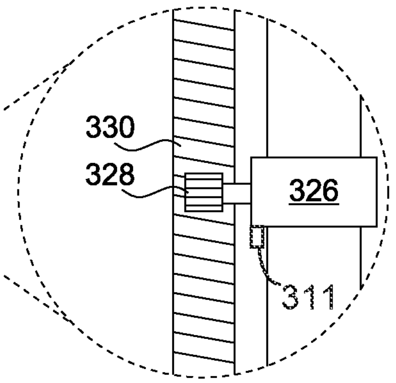
FIG. 12 is a partial view of part of the cable spray system from FIG. 11.

FIG. 12 shows a schematic, cross-sectional view of one of the cable modules 312. As shown, cable modules 312 can fully or partially surround the vertical supports 306. As shown in FIG. 12, a motor 326 is mounted on cable module 312. The motor 326 can be an electrical rotor-stator type motor, amongst other options. The motor 326 outputs rotational motion to pinion 328. Pinion 328 interfaces with track 330. Track 330 can include teeth, gearing, or other feature arrayed along one side of the support 306 and off of which rotation of the pinion 328 can push. Rotation of the pinion 328 pushes against track 330 to move the cable module vertically. The motor 326 can rotate the pinion 328 clockwise and counterclockwise to move the cable module 312 up and down along the vertical supports 306. While the motor 326, pinion 328, and track 330 are located on the cable module 312, these components can alternatively or additionally be positioned elsewhere, and/or other mechanisms can be used to move the cable module 312 vertically along support 306. The motor 326 can receive power from control circuitry to position the cable module 312 at an intended vertical position along the vertical supports 306. Sensor 311 can be positioned on the cable module 312 as shown, or alternatively can be positioned on the vertical support 306, and can sense the relative position of the cable module 312 on the vertical support 306. For example, sensor 311 can be an encoder mounted on the cable module 312 and can identify the passing of code remarks on the vertical support 306 indicating the position and distance traveled of the cable module 312 relative to the vertical support 306. This information can be provided to control circuitry for determining the relative position of the cable module 312 along the support 306 so that control circuitry can receive data about the respective heights and positional changes of the cable modules 316. Such positional data can help maintain cable modules 312 at equal elevations to provide for horizontally orientated cables 308. It is noted that two cable modules 312 are provided and it is intended that the two cable modules 312 would be at the same height with respect to each other so that the cables are kept horizontal.

Returning to FIG. 11, paint is supplied to the spray module 310 by hose 317 via pump 318. Pump 318 may be a piston pump that pulls paint from the reservoir 356 under pressure through the hose 317. The reservoir 356 can be a bucket. Also shown is power supply 316. Power supply 316 can be a battery, generator, or may access power from a conventional grid network. Power supply 316 supplies power to the cable-supported spray system 302, including spray module 310 and cable modules 312. In some embodiments, one or more of the pump 314, paint reservoir 356, and power supply 316 can be provided in the spray module 310 or the vertical supports 306.

FIG. 11 also shows lift 320. Lift 320 can be a vehicle capable of picking up and transporting vertical supports 306. For example, lift 320 can support and carry vertical support 306 on the job site and can lower in place vertical support 306 so that it is orientated vertically along the wall 304. Lift 320 can also pick up and transport the vertical support 306 away from the job site. The lift 320 include a hydraulic cradle for tipping the support 306 onto the cradle so that the vertical support 306 is fully supported by lift 320 and can be carried away by lift 320.

An operator controls operation of the cable-supported spray system 302 with interface 357, which can include the components and capabilities of any interface referenced herein, and can control the spray module 310 and receive data from the spray module 310 such as images.

Figure 13:
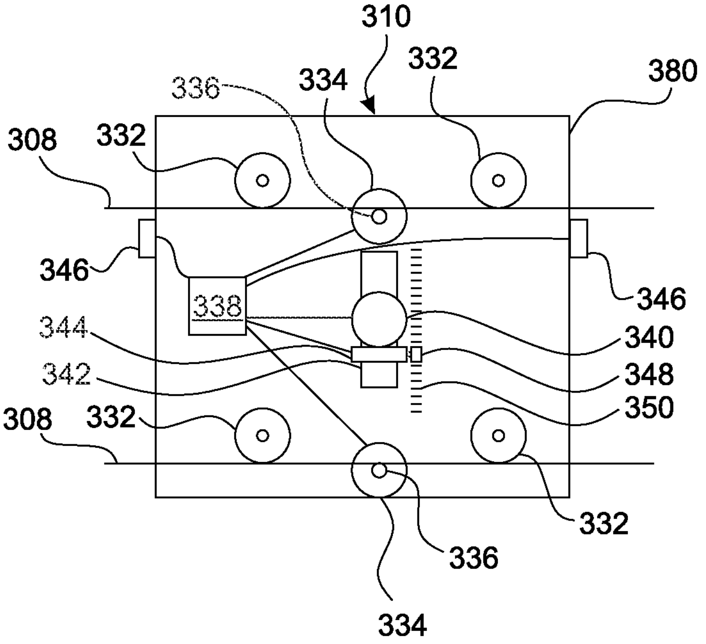
FIG. 13 is a cross sectional view of a spray module of the cable spray system.
Figure 14:
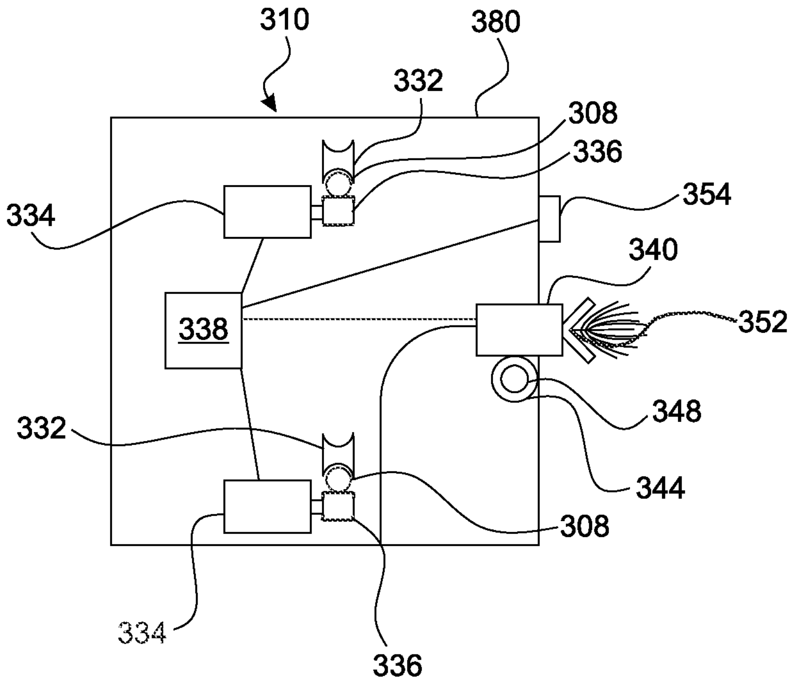
FIG. 14 is a cross sectional side view of the spray module of the cable spray system from a different orientation as FIG. 13.

FIG. 13 is a schematic, cross-sectional view of the spray module 310. FIG. 14 is another schematic, cross-sectional view of the spray module 310 orthogonal to the orientation of FIG. 13. The cables 308 are shown extending through the housing 380 of the spray module 310. Each wheel 332 has a groove (in the manner of a sheave or pulley wheel) that receives the cable 308 so that the wheel 332 rides on the cable 308. While two wheels 332 are shown for each cable 308, a single wheel 332 or more than two wheels 332 may alternatively be used for each cable 308.

Also engaging each wheel is roller 336. The roller 336 can be a cylinder (e.g., formed from rubber) that rolls along the cable 308. In this case, the rollers 336 engages the underside of the cable 308 on the opposite side of the wheels 332. Each roller 336 is rotated by a motor 334. Each motor 334 can be an electric rotor-stator type motor. Rotation of the rollers 336 move the spray module 310 relative to the cable 308. In this way, clockwise or counterclockwise rotation of the rollers 336 can move the spray module 310 horizontally left and right to complete spray passes along the wall 4. For example, the spray module 10 may be located at a leftward or rightward most location along the cables 308, and control circuitry can then command the motor 334 to operate the rollers 336 to rotate to move the spray module 310 horizontally to the other side of the cables 308, the spray module 310 spraying the wall 304 while in motion, spraying a horizontal stripe along the wall 304 with each pass.

Spray fluid is released from nozzle 352 on the wall 304. The spray module 310 includes spray valve 340. Spray valve 340 may control release of the spray fluid from the nozzle 352. Spray valve 340 can be a solenoid actuated valve for opening to release fluid as a spray and closing to stop spraying. The spray valve 340 may be controlled by control circuitry to open and close. In some versions, the spray valve 340 can be a mechanical valve that opens when upstream pressure overcomes a spring to open the valve (e.g., corresponding to when pump 314 starts pumping) and closes when upstream pressure no longer overcomes the spring (e.g., corresponding to when pump 314 stops pumping).

Spray module 310 further includes sensors 346. Sensors 346 are located on the lateral sides of the housing 380 of spray module 310. The sensors 346 can detect distance and/or proximity relative to the cable modules 312 and/or vertical supports 306. For example, the sensors can detect the distance of the cable modules 312 and/or supports 306. Distance information can be input to control circuitry to provide information regarding how close or far away the spray module 310 is from the cable modules 312 and/or supports 306. The distance information can also indicate the extent of travel of the spray module 310, so that the control circuitry can confirm movement of the spray module 310, and in some embodiments, the velocity of the spray module 310 for controlling constant velocity of the spray module 310. Sensors 346 may be rangefinders. Sensors 346 may be lidar, ultrasonic, or other time-of-flight sensors. Alternatively or additionally, sensors 346 may be located on the cable modules 312 or support 306 and detect the position of the spray module 310, such as by measuring the distance from the cable module 312 and/or vertical support 306 to the spray module 310, and/or how much cable has been let out/taken in (e.g., for use with the system of FIG. 16).

Spray module 310 further includes sensor 354. Sensor 354 may represent a single sensor or multiple sensors. The sensor 354 is configured to detect the wall 304 and/or a parameter of the wall 304. Sensor 354 may detect the distance to the wall 304, and may be of a type of sensor previously mentioned. Sensor 354 may be a camera that captures images or video that is communicated to the user interface 357 for display on a screen for visualizing the spray operation. Sensor 354 may identify areas of the wall 304 that have been sprayed relative to areas that have not yet been sprayed, such as for the control circuitry changing the elevation of the cable modules 312 for spraying a next horizontal strip that is adjacent to or overlapping with the previous stripe.

In some embodiments, the spray nozzle 352 can be moved vertically relative to the cables 308. In some embodiments, the spray nozzle 352 can be moved vertically relative to the housing 380 of the spray module 308. In the illustrated embodiment, motor 344 may operate to move the spray valve 340 and nozzle 352 upwards and downwards relative to the cables 308 and housing 380 of the spray module 310. Specifically, the motor 344 outputs rotational motion to pinion 348 which engages track 350. Track 350 may include teeth, gears, or other features that interface with the pinion 348. In this embodiment, the motor 344 is fixed to the spray valve 340 and the nozzle 352 while the track 350 is fixed to the housing 380 of the spray module 310, so that the spray valve 340 and nozzle 352 are moved relative to the housing 380 of the spray module 310. The spray valve 340 and nozzle 352 can extend through vertical slot 342 formed in the housing 380 of the spray module 310 to permit vertical relative movement between the spray valve and nozzle 352 on one hand and the housing 380 of the spray module 310 on the other hand. Such relative vertical movement compensates for sag in the cables 308. For example, cables 308 may sag such that the spray module 310 changes in elevation as it goes from one side of the cables 308 to the other side of the cables 308 which would result in a bowed, nonlinear horizontal stripe being sprayed. To compensate, the control circuitry can operate motor 344 to move the spray nozzle 352 vertically so that the nozzle 352 stays level throughout the spray pass despite sagging of the cables 308. A sensor (e.g., as part of package of sensors 354) can measure the sag, send such information to controller 338, which can control motor 344 to move the nozzle 352 upward in response to a downward movement of the sensor. For example an accelerometer can measure the downward acceleration corresponding with sag as the spray module 310 is moved along the cables 308, which the controller 338 can identify and respond by causing a corresponding elevation of the nozzle 352 by output to the motor 344, and the accelerometer can then measure an upward acceleration corresponding with the upward bend in the cables 308 after the spray module 310 climbs out of the sag which the controller 338 can identify and respond by causing a corresponding elevation of the nozzle 352 by the motor 44. As such, the controller 338 can cause the motor 344 to raise the nozzle 352 during the first half of the travel of the spray module 310 between vertical supports 306 and then cause the motor 344 to lower the nozzle 352 during the second half of the travel of the spray module 310 between vertical supports 306. In some cases, the motor 344 can increase or decrease the vertical position of the nozzle 352 during the travel of the spray module 310 to compensate for a differential in elevation of the ends of the cables 308 (e.g., a condition in which the cables themselves are slanted such that one end is higher than the other).

The spray module includes controller 338. Controller 338 can be part of control circuitry of the cable-supported spray system 302. Controller 338 can include a processor in communication with memory. Memory can include program instructions, executable by the processor, for performing any of the operations referenced herein. The processor can be a single processor such as an integrated microchip, or multiple processing units in communication. Control circuitry can additionally or alternatively include other types of logic circuitry, such as gate arrays, for performing the functions referenced herein. Control circuitry can include the circuitry of user interface 357. The interface 357 can include an equivalent processor and memory amongst other components referenced herein. Control circuitry can communicate with all motors, including motors 326 of cable modules 312, to control motion of the cable-supported spray system 302. Interface 357 may be remote from the spray module 310 and communicate (e.g., wirelessly) with spray module 310 and/or cable modules 312. The interface 357 may be a handheld computer with a readout for displaying information (e.g., images from sensors 354 of the wall 304) and include inputs for commands (e.g., initiating motion of spray module 310 and/or spraying from the spray module 310).

In operation, the user positions the vertical supports 306 such that the cables 308 are strung between them, ideally taut and level. The user operates the user interface 357 to command the control circuitry (which in term communicates with the motors referenced herein) to position the cable modules 312 at equivalent or near equivalent heights, such as by supplying power to motors 326. Sensor 311 identifies the starting and relative positions of the cable modules 312 along the vertical supports 306. The control circuitry can receive data from the sensors 311 to position and/or move the cable modules 312 to equivalent positions along the respective vertical supports 306. The spray module 310 can be positioned on the left or right side of the span of cables 308, such as by the motors 334 moving the spray module 310 along the cables 308. Sensors 346 can be used to sense an initial and the relative position of the spray module 310 relative to the cable modules 312, the control circuitry may use this data to determine the position of the spray module 310 relative to one of the cable modules 312. For example, the control circuitry may be programmed to position the spray module 310 a predetermined distance, such as 1 foot, away from one of the cable modules 312.

With the spray module 310 in the initial position, the control circuitry can control movement of the spray module 310 laterally along the span of the cables 308 while spraying to spray a horizontal stripe. Control circuitry can cause the motors 334 to rotate to move the spray module 310 along cables 308 at a predetermined velocity, the velocity and position measured by the sensors 346. Sensors 346 can monitor the movement of the spray module 310 and the control circuitry can stop the movement of the spray module 310 based on proximity to the opposite cable module 312 from which the spray module 310 started. For example, the control circuitry can be programmed to stop the spray module from moving and spraying a predetermined distance from the other of the cable modules 312, such as 1 foot. For example, control circuitry can control the motors 334 to stop at the predetermined distance from the other cable modules 312, the control circuitry can cause the valve 340 to stop spraying at the predetermined distance or before the spray module 310 reaches the predetermined distance from the other cable module 312. It may be preferred to have a valve 340 stop spraying while the spray module 310 is in motion to spray an even coating on the wall 304, to avoid spaying while the spray module 310 is stationary. Control circuitry can cause the spray module 310 to stop spraying before or at the moment that the spray module 310 stops its horizontal movement.

With the spray module 310 stopped, the control circuitry can cause the cable modules 312 to move up or down to spray the next horizontal stripe. The distance moved up or down may be a full height of the spray fan generated by the spray module 310 so that each horizontal stripe is adjacent another horizontal stripe (e.g., preferably with no gap between the sprayed stripes). The distance moved up or down may be a half height of the spray fan generated by the spray module 310 so that each horizontal stripe overlaps by 50% with the last horizontal stripe sprayed. A different degree of overlap may be selected by the user via the interface 356 and the amount of up or down movement of the cable modules 312 set accordingly by the control circuitry. A user may use the interface 357 to input and overlap parameter any size the spray fan the control circuitry can then calculate the distance moved up or down by the cable modules 312 between each horizontal stripe. Once the cable modules 312 have moved to the next vertical position, and the spray module 310 is located near one of the cable modules 312 as an initial position, the control circuitry can cause horizontal movement of the spray module 310 to spray another horizontal stripe, using a similar procedure to start and stop. This procedure can then be repeated for however many stacked horizontal stripes are needed to paint a solid pattern on the wall 304.

Figure 15:
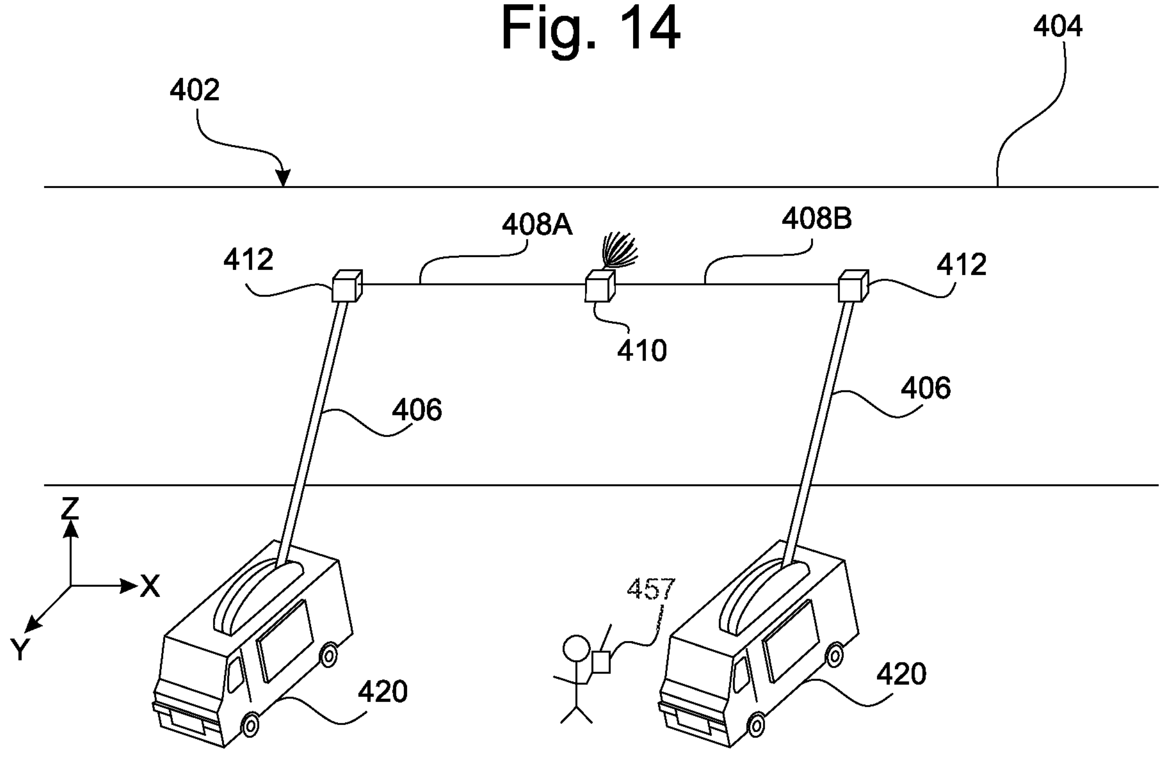
FIG. 15 is a perspective view of another cable spray system for spraying a wall.

FIG. 15 shows a cable-supported spray system 402 similar to that of the previous figures. Similar parts share the same base two digit reference numbers with this additional embodiment being in the 400 series (e.g., 320 and 420). The parts and functions are similar except or otherwise described or illustrated, and common aspects may not be re-described or illustrated.

The cable-supported spray system 402 includes two lifts 420. Each lift includes a vertical support 406, which in this embodiment is a boom. The booms can be telescopic or folding booms, amongst other options, to change length and elevation. At the end of the vertical supports 406 are cable modules 412. The lifts 420 can move the vertical supports 406 in three dimensions (represented by X, Y, Z axis) to position the cable modules 412 as desired along the wall 402. The cables 408A-B extends laterally from the cable module 412 in respective directions. A spray module 410 is supported between cables 408A-B, and only by cables 408A-B in this embodiment. In this embodiment, separate cables 408A-B connect with the respective cable modules 412. The other ends of the cables 408A-B can be attached to the spray module 410 such as with a hook-an-eyelet connection on the housing 480 of the spray module 410. While the cable module 310 moved along the cables 308 in the previous embodiment, the cable module 410 is fixed on the cables 408A-B. As further described herein, the spray module 410 can be moved laterally by moving the cables 408A-B.

Figure 16:
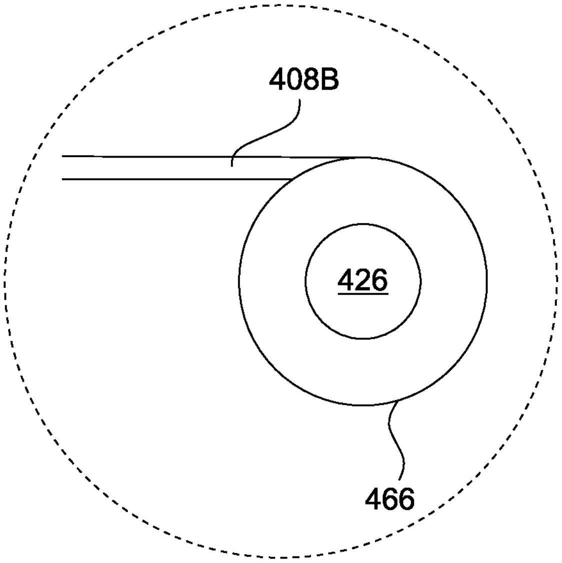
FIG. 16 is a detailed view of a part of the cable spray system from FIG. 15.

FIG. 16 shows a schematic, cross-sectional view of a cable module 412. Within the cable module 412, a motor 426 rotates a reel 466. The cable 408B can be wrapped around the reel 466 to spool and unspool the cable 408B. Spray module 410 can be moved horizontally by one of the cable modules 412, taking in cable 408A while the other cable module 412 lets out cable 408B a complementary amount so that the cables 408A-B stay taught but move the spray module 410 laterally. In this manner, spray module 410 can be moved both left and right to paint horizontal stripes on the wall 404. The lifts 420 can lower the cable modules 412 to spray horizontal stripes at a plurality of heights on the wall 404 to cover the wall 404 in paint. The procedure for spraying a stack of horizontal stripes can be the same as provided for the embodiment of FIGS. 11-14, except that the motors 426 move the spray module 410 horizontally instead of motors 334, and lifts 420 move the cable modules 412 vertically via supports 406 instead of the cable modules 312 moving themselves along supports 306.

An operator controls operation of the cable-supported spray system 402 with interface 457, which can include the components and capabilities of any interface referenced herein, and can control the spray module 410, cable modules 412, and receive data from the spray module 410 such as images.

In the illustrated embodiment, the cable modules 412 may be fixed to the supports 406, such that the vertical supports 406 are moved to move the cable modules 412. This contrasts with the previous embodiment whereby the vertical supports 306 stay relatively stationary while the cable modules 312 move relative to the vertical supports 306.

Figure 17:
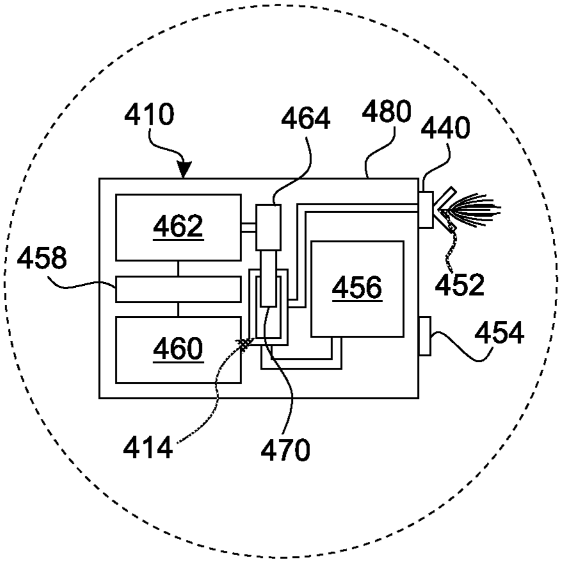
FIG. 17 is a cross sectional view of a spray module of the cable spray system from FIG. 15.

FIG. 17 shows a schematic, cross-sectional view of the spray module 410. Spray module includes a spray valve 440 for release of paint from nozzle 452. A reservoir 456 is supported by the spray module 410. More specifically, the reservoir 456 is located within the housing 480 of the spray module 410. Spray module 410 can feed the pump 414. The pump 414 can comprise a piston 470 operated by a drive 464 that converts rotational output from the motor 462 (e.g., electric motor) to reciprocating motion to drive the piston 470.

In this embodiment, control circuitry is located on board the spray module 410. In particular, memory 460 communicates with processor 458 to control motor 462. Processor 458 can similarly control the other motors (e.g., motors 426) and/or valves (e.g., valve 440) referenced herein. Spray valve 440 may be mechanically operated by being overcome by pressure developed by piston 470 as operated by the motor 462 or the spray valve 440 may be operated electrically by the processor 458 to spray. Control circuitry may include the components of the interface 457, which can wirelessly communicate with the spray module 410 and lifts 420.

While two lifts 420 are shown in which embodiment, one vertical support 306 as in the embodiment of FIGS. 11-14 may be used as a first vertical support and one of lifts 420 may be used as the second vertical support.

Any reference made to a motor herein could be an electric motor, such as brushed DC or brushless AC induction motor, amongst other options. A motor could also be a combustion motor. A motor could also be a pneumatic or hydraulic motor, supplied with fluid under pressure.

While the invention(s) has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention(s) without departing from the essential scope thereof. Therefore, it is intended that the invention(s) not be limited to the particular embodiment(s) disclosed, but that the invention(s) may include all embodiments falling within the scope of the appended claims. Any single feature, or any combination of features from one embodiment show herein, may be utilized in a different embodiment independent from the other features shown in the embodiment herein. Accordingly, the scope of the invention(s) and any claims thereto are not limited to the particular to the embodiments and/or combinations of the features shown herein, but rather can include any combination of one, two, or more features shown herein.

The invention claimed is:

1. A method of moving an arm along a wall for spraying the wall with a spray system, the method comprising:

receiving a user input corresponding to a command to move an end of an arm along the wall in a first direction, the first direction being vertically along the wall;

sensing the wall with at least one sensor to output an indication of a separation distance between the at least one sensor and the wall;

moving the arm vertically along the wall in the first direction in response to the command and based on the indication of the separation distance, the arm supported on a mobile base, the arm extending out from and beyond the mobile base, the arm configured to articulate in three dimensions relative to the mobile base, wherein moving the arm vertically along the wall in the first direction comprises moving the arm in at least two dimensions including changing a vertical pivot angle of the arm relative to the mobile base while the arm one of extends or retracts horizontally relative to the mobile base so that the end of the arm moves along the wall in the first direction responsive to the input while maintaining the separation distance responsive to the indication of the separation distance by the arm extending or retracting horizontally and pivoting vertically relative to the mobile base based at least in part on the indication from the sensor to maintain the separation distance simultaneous with the end of the arm moving vertically along the wall in the first direction; and spraying the wall from the arm.

2. The method of claim 1, wherein the step of spraying the wall is performed while moving the arm along the wall in response to the command and the indication of the separation distance.

3. The method of claim 1, further comprising a bucket supported by the arm, the bucket containing a person holding a spray gun that is performing the spraying of the wall.

4. The method of claim 1, wherein the mobile base supported by a plurality of wheels.

5. The method of claim 1, wherein the steps of moving the arm and spraying the wall from the arm are performed simultaneously.

6. A method of moving an arm along a wall for spraying the wall with a spray system, the method comprising:

receiving a user input corresponding to a command that requires movement an end of an arm along the wall in a first direction, the first direction being vertically along the wall;

sensing the wall with at least one sensor to output an indication of a separation distance between the at least one sensor and the wall;

moving the arm vertically along the wall in the first direction in response to the command and based on the indication of the separation distance, the arm supported on a mobile base, the arm extending out from and beyond the mobile base, the arm configured to articulate in three dimensions relative to the mobile base, wherein moving the arm vertically along the wall in the first direction comprises moving the arm in at least two dimensions including changing a vertical pivot angle of the arm relative to the mobile base while the arm one of extends or retracts horizontally relative to the mobile base so that the end of the arm moves along the wall in the first direction responsive to the input while maintaining the separation distance responsive to the indication of the separation distance by the arm extending or retracting horizontally and pivoting vertically relative to the mobile base based at least in part on the indication from the sensor to maintain the separation distance simultaneous with the end of the arm moving vertically along the wall in the first direction; and spraying the wall from the arm.

7. The method of claim 6, wherein the step of spraying the wall is performed while moving the arm along the wall in response to the command and the indication of the separation distance.

8. The method of claim 6, further comprising a bucket supported by the arm, the bucket containing a person holding a spray gun that is performing the spraying of the wall.

9. The method of claim 6, wherein the mobile base supported by a plurality of wheels.

10. The method of claim 6, wherein the steps of moving the arm and spraying the wall from the arm are performed simultaneously.

11. A method of moving an arm along a wall for spraying the wall with a spray system, the method comprising:

receiving a user input corresponding to a command that requires movement an end of an arm along the wall in a first direction, the first direction being horizontally along the wall;

sensing the wall with at least one sensor to output an indication of a separation distance between the at least one sensor and the wall;

moving the arm vertically along the wall in the first direction in response to the command and based on the indication of the separation distance, the arm supported on a mobile base, the arm extending out from and beyond the mobile base, the arm configured to articulate in three dimensions relative to the mobile base, wherein moving the arm horizontally along the wall in the first direction comprises moving the arm in at least two dimensions including changing a vertical pivot angle of the arm relative to the mobile base while the arm one of extends or retracts horizontally relative to the mobile base so that the end of the arm moves along the wall in the first direction responsive to the input while maintaining the separation distance responsive to the indication of the separation distance by the arm extending or retracting horizontally and pivoting vertically relative to the mobile base based at least in part on the indication from the sensor to maintain the separation distance simultaneous with the end of the arm moving horizontally along the wall in the first direction; and spraying the wall from the arm.

12. The method of claim 11, wherein the step of spraying the wall is performed while moving the arm along the wall in response to the command and the indication of the separation distance.

13. The method of claim 11, further comprising a bucket supported by the arm, the bucket containing a person holding a spray gun that is performing the spraying of the wall.

14. The method of claim 11, wherein the mobile base supported by a plurality of wheels.

15. The method of claim 11, wherein the steps of moving the arm and spraying the wall from the arm are performed simultaneously.

* * * * *